US011982743B2

United States Patent
Chen et al.

(10) Patent No.: US 11,982,743 B2
(45) Date of Patent: May 14, 2024

(54) REDUCING SIZE OF LIDAR SYSTEM CONTROL ASSEMBLIES

(71) Applicant: SiLC Technologies, Inc., Monrovia, CA (US)

(72) Inventors: Chen Chen, Arcadia, CA (US); Bradley Jonathan Luff, La Canada Flintridge, CA (US)

(73) Assignee: SiLC Technologies, Inc., Monrovia, CA (US)

( * ) Notice: Subject to any disclaimer, the term of this patent is extended or adjusted under 35 U.S.C. 154(b) by 269 days.

(21) Appl. No.: 17/244,869

(22) Filed: Apr. 29, 2021

(65) Prior Publication Data

US 2022/0350023 A1    Nov. 3, 2022

(51) Int. Cl.

| G01S 17/06 | (2006.01) |
| G01S 7/48 | (2006.01) |
| G01S 7/481 | (2006.01) |
| G01S 17/58 | (2006.01) |

(52) U.S. Cl.
CPC ............ *G01S 17/06* (2013.01); *G01S 7/4808* (2013.01); *G01S 7/4811* (2013.01); *G01S 17/58* (2013.01)

(58) Field of Classification Search
CPC ...... G01S 17/06; G01S 7/4808; G01S 7/4811; G01S 17/58; G01S 7/4812; G01S 7/4818; G01S 17/34
USPC .......................................................... 356/27
See application file for complete search history.

(56) References Cited

U.S. PATENT DOCUMENTS

| 5,953,468 A | 9/1999 | Finnila et al. |
| 7,345,744 B2 | 3/2008 | Halmos et al. |
| 10,564,268 B2 | 2/2020 | Turbide et al. |
| 2020/0319409 A1* | 10/2020 | Su ........................... H04B 10/67 |
| 2020/0408911 A1* | 12/2020 | Boloorian ............... G01S 17/58 |
| 2021/0010802 A1 | 1/2021 | Onohara et al. |
| 2021/0356592 A1 | 11/2021 | Behroozpour |

OTHER PUBLICATIONS

Matos, Taina, International Search Report and Written Opinion, PCT/US2022/026233, International Searching Authority, United States Patent and Trademark Office, dated Jun. 27, 2022.
Wittmann-Regis, Agnes, International Preliminary Report on Patentability and Written Opinion, PCT/US2022/026233, The International Bureau of WIPO, dated Nov. 9, 2023.

* cited by examiner

Primary Examiner — Md M Rahman
(74) Attorney, Agent, or Firm — Gavrilovich, Dodd & Lindsey LLP

(57) ABSTRACT

A LIDAR system has one or more light splitters and multiple light combiners. The LIDAR system also has multiple optical pathways through which light signals travel. The optical pathways include delay pathways that each extends from one of the one or more splitters to one of the light combiners. The optical pathways include expedited pathways that each extends from one of the splitters to one of the light combiners. Each of the light combiners has one of the delay pathways and one of the expedited pathways extending to the light combiner. The delay pathways and the expedited pathways are configured such that the delay pathway to each light combiner is longer than the expedited pathway to the same light combiner. Each of the delay pathways has a common portion and a separated portion. The common portion of each delay pathway is shared by the other delay pathways. In contrast, the separated portion of a delay pathways is not shared with the other delay pathways.

20 Claims, 13 Drawing Sheets

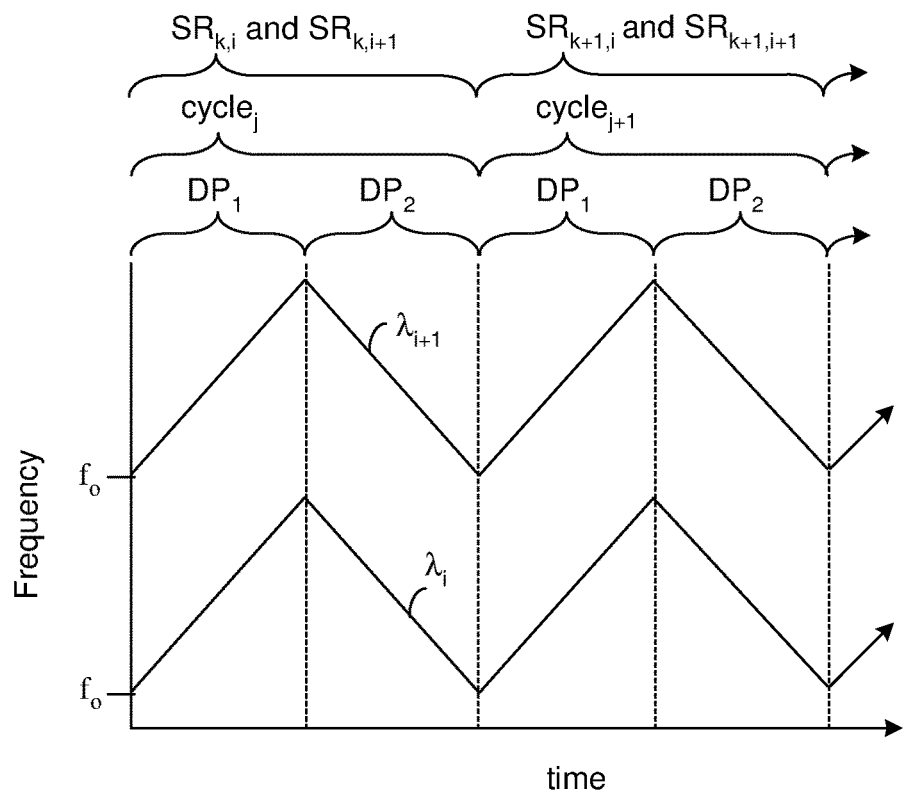
Figure 7C
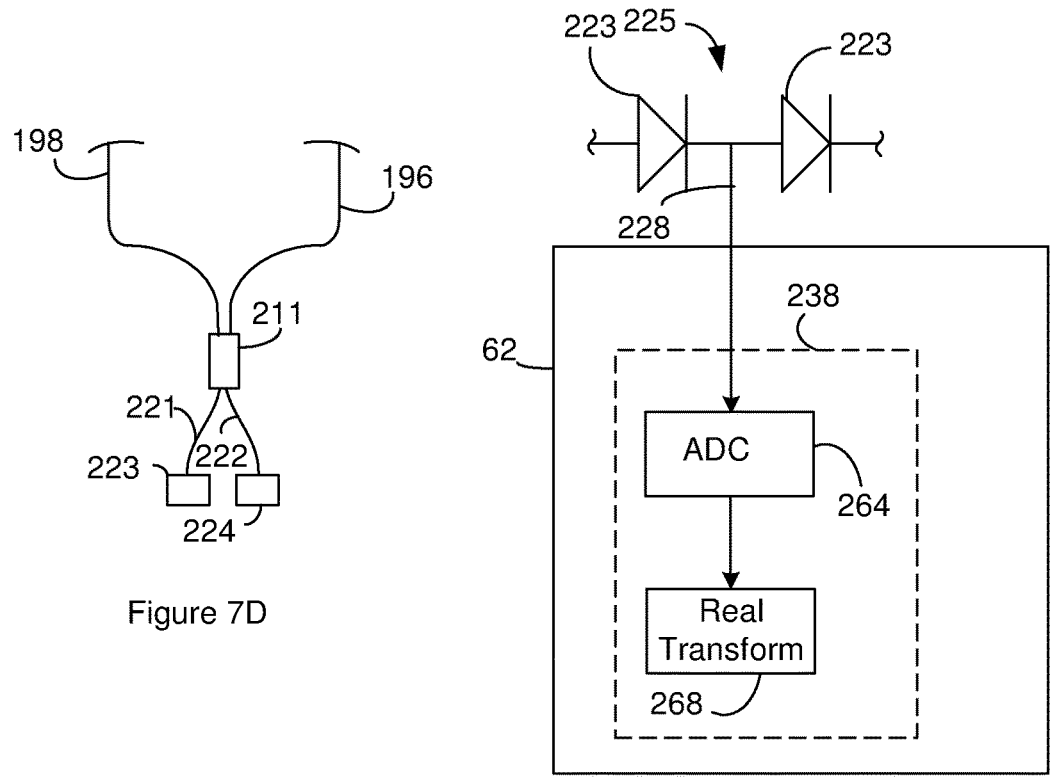
Figure 7D
Figure 7E

REDUCING SIZE OF LIDAR SYSTEM CONTROL ASSEMBLIES

FIELD

The invention relates to optical devices. In particular, the invention relates to LIDAR assemblies.

BACKGROUND

There is an increasing commercial demand for LIDAR systems that can be deployed in applications such as ADAS (Advanced Driver Assistance Systems) and AR (Augmented Reality). LIDAR (Light Detection and Ranging) systems typically output a system output signal that is reflected by an object located outside of the LIDAR system. At least a portion of the reflected light signal returns to the LIDAR system. The LIDAR system directs the received light signal to a light sensor that converts the light signal to an electrical signal. Electronics can use the light sensor output to quantify LIDAR data that indicates the radial velocity and/or distance between the object and the LIDAR system.

Many LIDAR systems tune the frequency of the system output signal linearly or with other well-defined waveforms versus time to enable the accurate measurement of LIDAR data. In these instances, the LIDAR system can monitor the frequency of the system output signal and tune the frequency in response to the monitored frequency to achieve the desired waveform shape. The systems used to monitor the frequency of the system output signal can require one or more waveguides that need to be undesirably long in order to achieve the desired results. As a result of this waveguide length, these systems often occupy a large percentage of the available space on a LIDAR chip. As a result, there is a need for an improved system for monitoring the frequency of LIDAR system output signals.

SUMMARY

A LIDAR system has one or more light splitters and multiple light combiners. The LIDAR system also has multiple optical pathways through which light signals travel. The optical pathways include delay pathways that each extends from one of the one or more splitters to one of the light combiners. The optical pathways include expedited pathways that each extends from one of the splitters to one of the light combiners. Each of the light combiners has one of the delay pathways and one of the expedited pathways extending to the light combiner. The delay pathways and the expedited pathways are configured such that the delay pathway to each light combiner is longer than the expedited pathway to the same light combiner. Each of the delay pathways has a common portion and a separated portion. The common portion of each delay pathway is shared by the delay pathways. In contrast, the separated portion of a delay pathways is not shared with the other delay pathways.

Another embodiment of the LIDAR system has a light splitter and a light combiner. The LIDAR system also has multiple optical pathways through which light signals travel during operation of the LIDAR system. The optical pathways include a delay pathway that extends from the splitters to the light combiner. The optical pathways also include an expedited pathway that extends from the splitter to the light combiner. The delay pathway and the expedited pathway are configured such that the delay pathway is longer than the expedited pathway. The delay pathway having a return component configured to receive a delay pathway light signal traveling a first direction along the delay pathway and to return the delay pathway light signal to the delay pathway traveling in a second direction that is the reverse of the first direction. In some instances, the delay pathway includes a spiral waveguide.

BRIEF DESCRIPTION OF THE FIGURES

FIG. 7C is a graph of frequency versus time for a system output signal with triangular frequency tuning.

FIG. 7D illustrates another example of a processing component suitable for use with the LIDAR systems.

FIG. 7E provides a schematic of electronics that are suitable for use with a processing component constructed according to FIG. 7D.

FIG. 8A illustrates an interface between optical components and light sensors that can be positioned on a LIDAR chip.

FIG. 8B is a schematic of a relationship between the electronics and light sensors that can be included on a LIDAR chip.

FIG. 10B is a top view of a portion of a LIDAR chip that has the return device.

FIG. 10C is a cross section of the return device 82 taken along the line labeled C in FIG. 10B.

FIG. 10D is a cross section of the return device 82 taken along the line labeled C in FIG. 10B.

DESCRIPTION

Figure 1A:
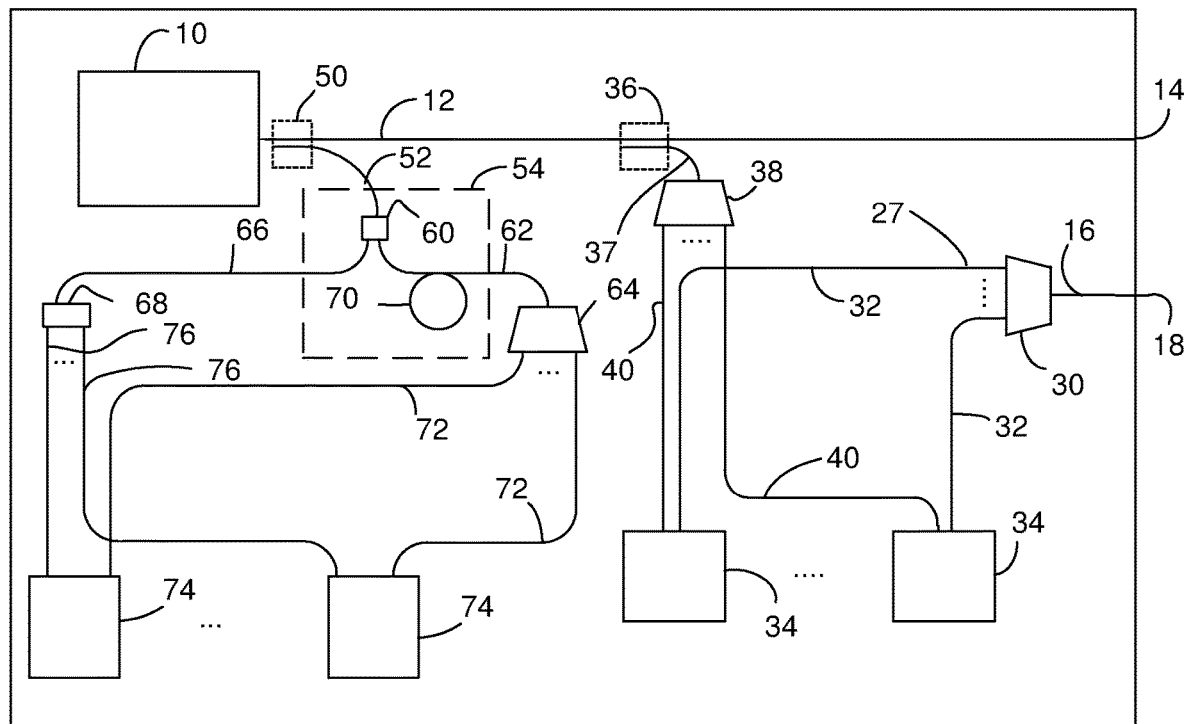
FIG. 1A is a top view of a LIDAR chip.

A LIDAR system is configured to output multiple different system output signals that each carries a different channel. The LIDAR system has multiple control mechanisms that are each configured to control a frequency versus time pattern of at least one of the system output signals.

The LIDAR system also includes one or more light splitters, multiple light combiners, and multiple optical pathways through which light signals travel. The optical pathways include delay pathways that each extends from one of the one or more splitters to one of the light combiners. The optical pathways also include expedited pathways that each extends from one of the splitters to one of the light combiners. One of the delay pathways and one of the expedited pathways extends to each of the light combiners.

During operation of the LIDAR system, delay pathway signals travel along the delay pathways and expedited pathway signals can travel along the expedited pathways. Different delay pathway signals can each carry a different one of the channels. Different expedited pathway signals can each carry a different one of the channels. The delay pathways and the expedited pathways can be configured such that the light combiners each receive a delay pathway signal and an expedited pathway signal that carries the same channel.

The delay pathway to each light combiner is longer than the expedited pathway to the same light combiner. The increased length of the delay pathways is sufficient to create a delay between the time a delay pathway signal is received at each light combiner and the time the expedited pathway signal is received at the light combiner.

Each of the delay pathways has a common portion and a separated portion. The common portion of each delay pathway is shared by the delay pathways. As a result, the delay pathway signals can be combined in the common portion of the delay pathways. In contrast, the separated portion of a delay pathways is not shared with the other delay pathways.

The common portion of the delay pathways can be the primary source of the length differential between the delay pathways and the expedited pathways. As a result, the common portion of the delay pathways can be the primary source of the desired delay between the delay pathway signal and the expedited pathway signal received at each of the light combiners. Since the delay pathway signals can be combined in the common portion of the delay pathways, the common portion of the delay pathways can provide the desired delay to each of the delay pathway signals. As a result, a pathway that is common to multiple signals that each carries a different channels can provide the desired delay to each of the signals. The ability to provide this delay to multiple different signals using a common path reduces the amount of space that the delay pathways need to create the desired delays in the LIDAR system.

One or more of the light combiners can each be included in each of the control mechanisms. The control mechanisms can use the delay between the delay pathway signal and the expedited pathway signal at a light combiner to control a frequency versus time pattern of at least one of the system output signals. The reduced space needed by the delay pathways reduces the space required by the control mechanisms. Since the system output signal(s) controlled by each of the control mechanisms can carry a different channel, the reduced size requirements of the control mechanisms associated with each of the different channels makes it is possible to increase the number of system output signals output from a LIDAR system without impractical increases in space requirements of the control mechanisms needed to control the additional system output signals.

A LIDAR system includes a control mechanism configured to control a process variable of a system output signal. In some instances, the control mechanism is a control loop such as a feedback control loop. The system output signal is the light signal that is output by the LIDAR system and then returns to the LIDAR system after being reflected by an object located outside of the LIDAR system. The LIDAR system can then use the reflected light to generate LIDAR data for the object. Examples of process variables that can be controlled by the control mechanism include the frequency and/or the phase of the system output signal.

The control mechanism generates a control signal that carries data indicating the value of the process variable. The control signal is generated from a process variable signal that includes an in-phase component and a quadrature component. The process variable signal is beating as a result of contributions from signals of different frequencies. The use of the quadrature component allows the frequency of the control signal to be increased relative to frequency of the control signal that would result when a process variable signal includes only an in-phase component. Increasing the frequency of the control signal decreases the beat frequency of the process variable signal that is needed to determine a value for the process variable. In prior systems, the beat frequency was increased by increasing the length of one of the waveguides in a Mach-Zehnder interferometer. Since the quadrature component reduces the required beat frequency, the quadrature component also reduces the length that is needed for one of the waveguides in a Mach-Zehnder interferometer. Accordingly, the quadrature component can reduce the amount of space on a LIDAR chip that is occupied by a control mechanism.

FIG. 1A is a top view of a LIDAR chip that includes a photonic integrated circuit. The photonic circuit can include a light source 10 that outputs an outgoing LIDAR signal. The outgoing LIDAR signal includes one or more different channels that are each at a different wavelength. The wavelengths of the channels can be periodically spaced in that the wavelength increase from one channel to the next channel (the channel spacing) is constant or substantially constant. In some instances, the channels spacing is constant and greater than 0.5 nm, 1 nm, 3 nm, or 5 nm, and/or less than 10 nm, 15 nm, or 20 nm. In some instances, the number of channels, N, is greater than 2, 4 or 8 and/or less than 16, 32, or 64. A suitable light source 10 for generating multiple channels with periodically spaced wavelengths includes, but is not limited to, comb lasers and one or more single wavelength and/or one or more multiple wavelength lasers with outputs multiplexed into an outgoing LIDAR signal.

The LIDAR chip also includes a utility waveguide 12 that receives the outgoing LIDAR signal from the light source 10. The utility waveguide 12 terminates at a facet 14 and carries the outgoing LIDAR signal to the facet 14. The facet 14 can be positioned such that the outgoing LIDAR signal traveling through the facet 14 exits the chip and serves as a LIDAR output signal. For instance, the facet 14 can be positioned at an edge of the chip so the outgoing LIDAR signal traveling through the facet 14 exits the chip and serves as a LIDAR output signal.

The LIDAR output signal travels away from the chip and may be reflected by objects in the path of the LIDAR output signal. The reflected signal travels away from the objects. When the LIDAR output signal is reflected, at least a portion of the light from the reflected signal is returned to an input waveguide 16 on the LIDAR chip as a LIDAR input signal. The input waveguide 16 includes a facet 18 through which the LIDAR input signal can enter the input waveguide 16. The portion of the LIDAR input signal that enters the input waveguide 16 can be considered an incoming LIDAR signal. The input waveguide 16 carries the incoming LIDAR signal to comparative demultiplexer 30. When the incoming LIDAR signal includes multiple channels, the comparative demultiplexer 30 divides the incoming LIDAR signal into different comparative signals that each carries a different one of the channels. The comparative demultiplexer 30 outputs the comparative signals on different comparative waveguides 32. The comparative waveguides 32 each carry one of the comparative signals to a different processing component 34.

The LIDAR chip includes a splitter 36 that moves a portion of the outgoing LIDAR signal from the utility waveguide 12 onto a reference waveguide 37 as a reference signal. Suitable splitters 36 include, but are not limited to, optical couplers, y-junctions, and MMIs.

The reference waveguide 37 carries the reference light signal to a reference demultiplexer 38. When the reference light signal includes multiple channels, the reference demultiplexer 38 divides the reference light signal into different reference signals that each has a different wavelength. The reference demultiplexer 38 outputs the reference signals on different reference waveguides 40. The reference waveguides 40 each carry one of the reference signals to a different one of the processing components 34.

The comparative waveguides 32 and the reference waveguides 40 are configured such that a comparative signal and the corresponding reference signal are received at the same processing component 34. For instance, the comparative waveguides 32 and the reference waveguides 40 are configured such that the comparative signal and the reference signal of the same wavelength and/or carrying the same channel are received at the same processing component 34.

As will be described in more detail below, the processing components 34 each combines a comparative signal with the corresponding reference signal to form a composite signal that carries LIDAR data for a sample region on the field of view. Accordingly, the composite signal can be processed so as to extract LIDAR data (radial velocity and/or distance between a LIDAR system and an object external to the LIDAR system) for the sample region.

The LIDAR chip can include a control assembly for controlling operation of the light source 10 and/or one or more features of a system output signal. The control assembly includes a splitter 50 that moves a portion of the outgoing LIDAR signal from the utility waveguide 12 onto a control waveguide 52. The coupled portion of the outgoing LIDAR signal serves as a tapped signal. The splitter 50 can be a wavelength independent splitter such as a directional coupler, optical coupler, y-junction, tapered coupler, and Multi-Mode Interference (MMI) device.

The control waveguide 52 carries the tapped signal to a differential delay mechanism 54 that can be a primary source of a delay between a delayed pathway signal and an expedited pathway signal. The delay mechanism 54 includes a splitter 60 that receives the tapped signal and divides the tapped signal into a delayed signal and an expedited signal. The splitter 60 can be a wavelength independent splitter. For instance, the second splitter 60 can be configured such that the delayed signal and the expedited signal carry the same or substantially the same selection of wavelengths. Accordingly, the delayed signal and the expedited signal can each carry multiple channels. In some instances, the delayed signal and the expedited signal each carries each of the channels. Suitable second splitters 68 include, but are not limited to, directional couplers, optical couplers, y-junctions, tapered couplers, and Multi-Mode Interference (MMI) devices.

A delay waveguide 62 carries the delayed signal to a first splitter 64. An expedited waveguide 66 carries the expedited signal to a second splitter 68. The delay waveguide 62 can include a delay section 70 that can be used to increase the length of the delay waveguide beyond the length of the expedited waveguide 66. For instance, the delay section 70 shown in FIG. 1A can represent a spiral arrangement of the delay waveguide 62. The longer length of the delay waveguide 62 creates the delay between the delayed signal and the expedited signal.

The first splitter 64 divides the delayed signal into delayed channel signals that are each carried on a different delayed channel waveguide 72. The first splitter 64 can be a wavelength dependent splitter. For instance, the first splitter 64 can be configured such that each of the delayed channel signals carries a different selection of wavelengths. As an example, the first splitter 64 can be configured such that each of the delayed channel signals carries a different one of the channels. Each of the delayed channel waveguide 72 carries one of the delayed channel signals to a different control component 74. As a result, each of the control components 74 receives a delayed channel signal carrying a different channel. Accordingly, each of the control components 74 can be associated with a different channel. Suitable first splitters 64 include, but are not limited to, demultiplexers such as arrayed waveguide gratings, echelle gratings, and ring resonator based devices.

The second splitter 68 divides the expedited signal into expedited sub-signals that are each carried on a different expedited sub-waveguide 76. The second splitter 68 can be a wavelength dependent splitter. For instance, the second splitter 68 can be configured such that each of the expedited sub-signals carries the same or substantially the same selection of wavelengths. Accordingly, each of the expedited sub-signals can carry multiple channels. In some instances, each of the expedited sub-signals carries each of the channels. Each of the expedited sub-waveguide 76 carries one of the expedited sub-signals to a different one of the control component 74. As a result, each of the control components 74 can receive an expedited sub-signal that carries the channel associated with that control component 74 and also carries one or more other channels. Accordingly, each of the control components 74 can receive an expedited sub-signal and a delayed channel signal that carry that same channel. Suitable second splitters 68 include, but are not limited to, directional couplers, optical couplers, y-junctions, tapered couplers, and Multi-Mode Interference (MMI) devices.

In some instances, the second splitter 68 is a wavelength dependent splitter. A wavelength dependent splitter that serves as the second splitter 68 can be configured such that the expedited sub-signals each carries a different one of the channels. Additionally, the expedited sub-waveguides 76 can be configured such that the expedited sub-signal that is received by each control component 74 carries the channel that is associated with that control component 74. As a result, each control component 74 can receive the expedited sub-signal that carries the same channel as the delayed channel signal that is received by the control component 74.

As is evident from the above description, light from the tapped signal travels on one of several different delay pathways from a splitter 60 to a combiner in one of the control components 74. Each of the delay pathways is primarily defined by the delay waveguide 62, the first splitter 64, and one of the delayed channel waveguides 72. Each of the delay pathways is traveled by a delay pathway signal that is a combination of the delay signal and one of the delayed channel signals. Light from the tapped signal also travels one of several different expedited pathways from the splitter 60 to a control component 74. The expedited pathways are each defined primarily by the expedited sub-waveguide 76, the second splitters 68, and one of the expedited sub-waveguides 76. Each of the expedited pathways is traveled by an expedited pathway signal that is a combination of the expedited signal and one of the expedited sub-signals.

Each of the delay pathways has a common portion and a separated portion. The common portion of each delay pathway is shared by the delay pathways. In contrast, the separated portion of a delay pathways is not shared with the other delay pathways. The light signals that travel through the common portion can carry multiple different channels. The light signals that travel through the separated portions can each carry a different channel. For instance, the delay waveguide 62 is common to each of the delay pathways and serves as the common portion. In contrast, the delayed channel waveguides 72 are each separated from the other delayed channel waveguides 72 and serve as a separated portion.

Each of the expedited pathways has a common portion and a separated portion. The common portion of each expedited pathway is shared by the expedited pathways. In contrast, the separated portion of an expedited pathways is not shared with the other expedited pathways. The light signals that travel through the common portion can carry multiple different channels. The light signals that travel through the separated portions can each carry a different channel. For instance, the expedited waveguide 66 is common to each of the delay pathways and serves as a common portion. In contrast, each of the expedited sub-waveguide 76 is separated from the other expedited sub-waveguide 76 and can serve as a separated portion.

The expedited pathways and the delayed pathways are configured such that each control component 74 receives a delayed pathway signal and an expedited pathway signal that carry the same channel (the common channel). The expedited pathways and the delayed pathways can configured such that each of the different control components 74 receives a delayed pathway signal and an expedited pathway signal that carry a different common channel. Additionally, the delay pathways and the expedited pathways can be configured such that the delay pathway signal and/or the expedited pathway signal received at each of the control components 74 carries only one of the channels or carries essentially only one of the channels.

The components that define the delay pathways and the expedited pathways are configured such that an expedited pathway signal and a delayed pathway signal that arrive at the same the control component 74 have the arrival of the delayed pathway signal at the control component 74 delayed relative to the arrival of the expedited pathway signal at the control component 74.

Because the delayed pathway signal and the expedited pathway signal include different portions of the tapped signal, each control component 74 receives a delayed portion of the tapped signal and also receives an expedited portion of the tapped signal with the delayed portion being delayed relative to the tapped portion. The components that define the delayed pathway and the expedited pathway can be configured to provide the delay between the tapped portion and the expedited portion arriving at the control component 74. For instance, the waveguides that define the delayed pathways and the waveguides that define the expedited pathways can be configured such that the delayed pathway is longer than the expedited pathway by a length that provides the delays desired at each control component 84. The length of the delay section 70 can be the primary source of the length difference between the delay pathway and the expedited pathway that lead to the same control component 74. As is evident from FIG. 1A, a delay signal that carries the different channels travels through the same delay section 70. As a result, the same delay section 70 is common to each of the delay pathways and each of the channels.

Figure 1A:
Figure 1B:
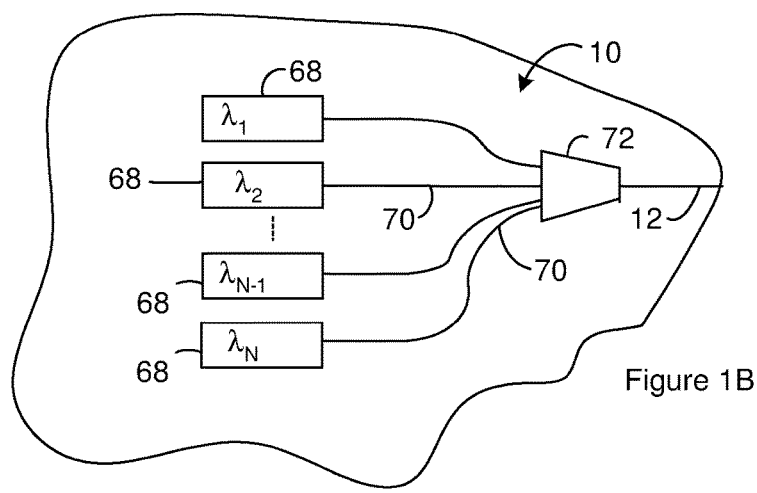
FIG. 1B illustrates a light source that includes multiple laser sources.

Although the light source 10 is shown as being positioned on the LIDAR chip, all or a portion of the light source 10 can be located off the LIDAR chip. FIG. 1B illustrates an example of a light source 10 that includes multiple laser sources 68. The light source of FIG. 1B can be located off the LIDAR chip, positioned on the LIDAR chip, or integrated on the LIDAR chip. In some instances, each of the laser sources 68 outputs a channel signal on a source waveguide 70. Each channels signal can carry one or more of the channels. Each of the source waveguides 70 carries a channel signals to a laser multiplexer 72 that combines the channel signals so as to form a light signal that is received on a channel waveguide or the utility waveguide 12. Suitable laser multiplexers 72 include, but are not limited to, Arrayed Waveguide Grating (AWG) multiplexers, echelle grating multiplexers, and star couplers. The electronics can operate the laser sources 68 so the laser sources 68 concurrently output each of the channels. The electronics can operate the laser sources 68 so the laser sources 68 concurrently output each of the channels.

In some instances, each of the laser sources 68 outputs one of the channels on a source waveguide 70. The total number of laser sources 68 included in the light source 10 can be greater than or equal to the number of LIDAR output signals that are concurrently directed to a sample region. In some instances, total number of laser sources 68 included in the light source 10 is equal to the number of LIDAR output signals that are concurrently directed to a sample region. As a result, each laser sources 68 can be the source of a different one of the LIDAR output signals that are concurrently directed to a sample region.

The electronics 62 can operate the laser sources 68 independently. For instance, the electronics can operate the laser sources 68 so as to provide particular LIDAR output signal(s) with a particular frequency versus time waveform. Since the electronics can operate the laser sources 68 independently and each laser sources 68 can be the source of a different one of the LIDAR output signals, the electronics can operate the laser sources 68 so different LIDAR output signals have different frequency versus time waveforms.

Figure 2:
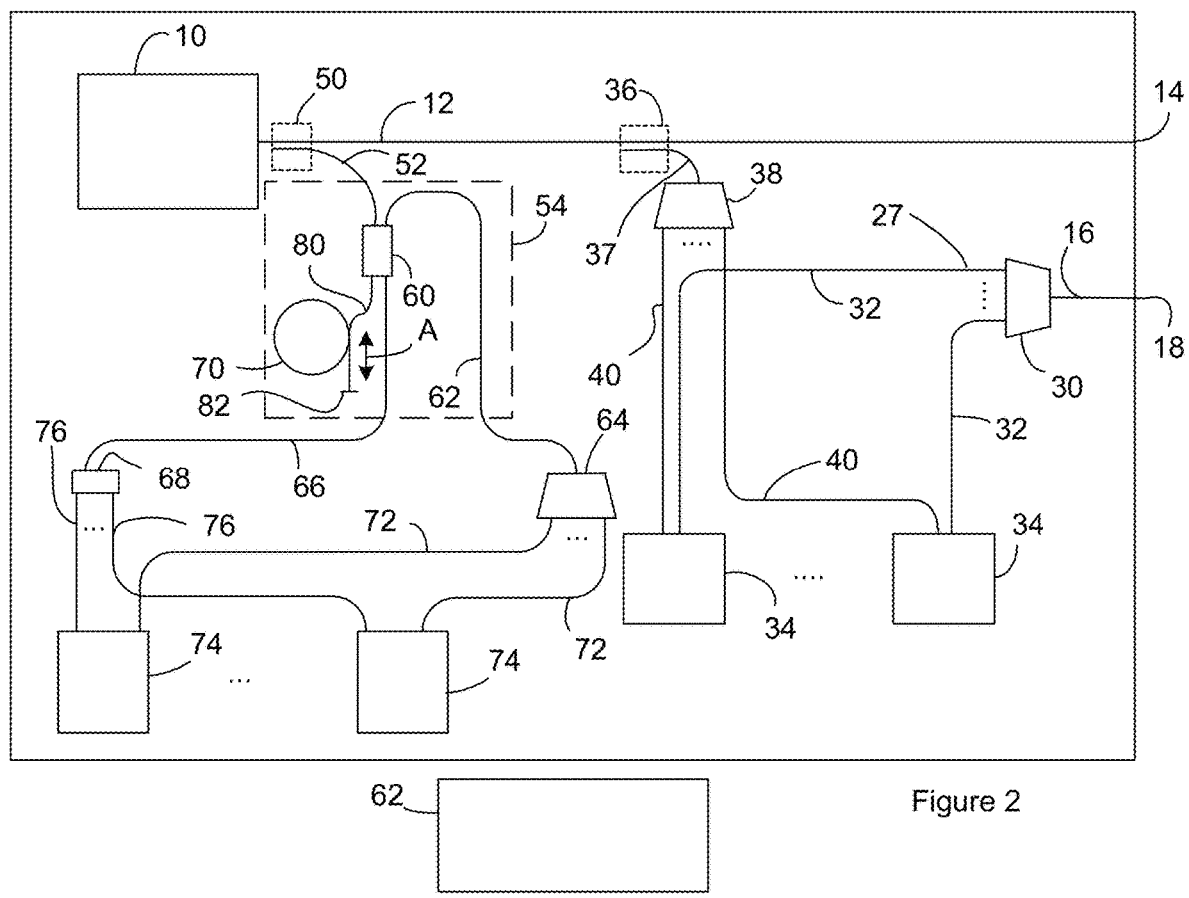
FIG. 2 is a top view of a LIDAR chip.

FIG. 2 illustrates the LIDAR chip of FIG. 1A and FIG. 1B modified to reduce the length of the delay section 70. The splitter 60 receives the tapped signal from the control waveguide 52 and divides the tapped signal into the expedited signal and a first delayed signal. The expedited signal is received on the expedited waveguide 66 as disclosed in the context of FIG. 1. Suitable splitters 60 include, but are not limited to, 2×2 (Multi-Mode Interference (MMI) couplers, and 2×2 directional couplers.

A first delay waveguide 80 receives the first delayed signal from the splitter 60. The first delay waveguide 80 carries the first delayed signal to a return device 82. The return device 82 is configured to return the first delayed signal to the first delay waveguide 80 such that the first delayed signal travels from the return device 82 back through the first delay waveguide 80 to the splitter 60. As a result, the first delayed signal travels through the first delay waveguide 80 twice. For instance, the first delayed signal travels through the first delay waveguide 80 once in each direction as illustrated by the arrow labeled A in FIG. 2. Suitable return devices 82 include, but are not limited to, mirrors, and reflective surfaces.

The splitter 60 receives the first delayed signal from the first delay waveguide 80 and outputs the first delay signal on the delay waveguide 62. The portion of the first delayed signal received on the delay waveguide 62 serves as a second delay signal carried on the delay waveguide 62. The delay waveguide 62 carries the second delay signal to the first splitter 64. Accordingly, light from the tapped signal travels from the splitter 60 through the first delay waveguide 80 twice and the delay waveguide 62 once before being received at the first splitter 64. As a result, the first delay signal and the second delay signal together effectively serve as the delay signal disclosed in the context of FIG. 1A.

The first delay waveguide 80 includes the delay section 70. The light traveling through the first delay waveguide 80 twice increases the effective pathlength that the delay signal travels between the splitter 60 and the first splitter 64. This increase in the effective pathlength allows the length of the delay section 70 to be reduced in order to provide the desired delay between the delay signal and the expedited signal.

As is evident from the above description of FIG. 2, light from the tapped signal travels on one of several different delay pathways from the splitter 60 to one of the control components 74. Each of the delay pathways is primarily defined by the first delay waveguide 80, the splitter 60, the delay waveguide 62, the first splitter 64, and one of the delayed channel waveguides 72. Each of the delay pathways is traveled by a delay pathway signal that is a combination of the first delayed signal, the second delayed signal, and one of the delayed channel signals. Light from the tapped signal also travels one of several different expedited pathways from the splitter 60 to a control component 74. The expedited pathways are each defined primarily by the expedited waveguide 66, the second splitter 68, and one of the expedited sub-waveguides 76.

Each of the delay pathways has a common portion and a separated portion. The common portion of each delay pathway is shared by the delay pathways. In contrast, the separated portion of a delay pathways is not shared with the other delay pathways. The light signals that travel through the common portion can carry multiple different channels. The light signals that travel through the separated portions can each carry a different channel. For instance, first delay waveguide 80 and the delay waveguide 62 is common to each of the delay pathways and serves as the common portion. In contrast, the delayed channel waveguides 72 are each separated from the other delayed channel waveguides 72 and serve as a separated portion.

Each of the expedited pathways has a common portion and a separated portion. The common portion of each expedited pathway is shared by the expedited pathways. In contrast, the separated portion of an expedited pathways is not shared with the other expedited pathways. The light signals that travel through the common portion can carry multiple different channels. The light signals that travel through the separated portions can each carry a different channel. For instance, the expedited waveguide 66 is common to each of the delay pathways and serves as a common portion. In contrast, each of the expedited sub-waveguide 76 is separated from the other expedited sub-waveguide 76 and can serve as a separated portion.

Each of the expedited pathways is traveled by an expedited pathway signal that is a combination of the expedited signal and one of the expedited sub-signals. The expedited pathways and the delayed pathways are configured such that each control component 74 receives a delayed pathway signal and an expedited pathway signal that carry the same channel (the common channel). The expedited pathways and the delayed pathways can be configured such that each of the different control components 74 receives a delayed pathway signal and an expedited pathway signal that carry a different one of the common channels. Additionally, the delay pathways and the expedited pathways can be configured such that the delay pathway signal and/or the expedited pathway signal received at each of the control components 74 carries only one of the channels or carries essentially only one of the channels.

The components that define the delay pathways and the expedited pathways are configured such that an expedited pathway signal and a delayed pathway signal that arrive at the same the control component 74 have the arrival of the delayed pathway signal at the control component 74 delayed relative to the arrival of the expedited pathway signal at the control component 74.

Because the delayed pathway signal and the expedited pathway signal represent different portions of the tapped signal, each control component 74 receives a delayed portion of the tapped signal and also receives an expedited portion of the tapped signal with the delayed portion being delayed relative to the tapped portion. The components that define the delayed pathway and the expedited pathway can be configured to provide the delay between the tapped portion and the expedited portion arriving at the control component 74. For instance, the waveguides that define the delayed pathways and the waveguides that define the expedited pathways can be configured such that the delayed pathway is longer than the expedited pathway by a length that provides the delays desired at each control component 84. The length of the delay section 70 can be the primary source of the length difference between the delay pathway and the expedited pathway that lead to the same control component 74. As is evident from FIG. 2, a first delay signals that carries the different channels travel through the same delay section 70. As a result, the same delay section 70 is common to each of the delay pathways.

Figure 3:
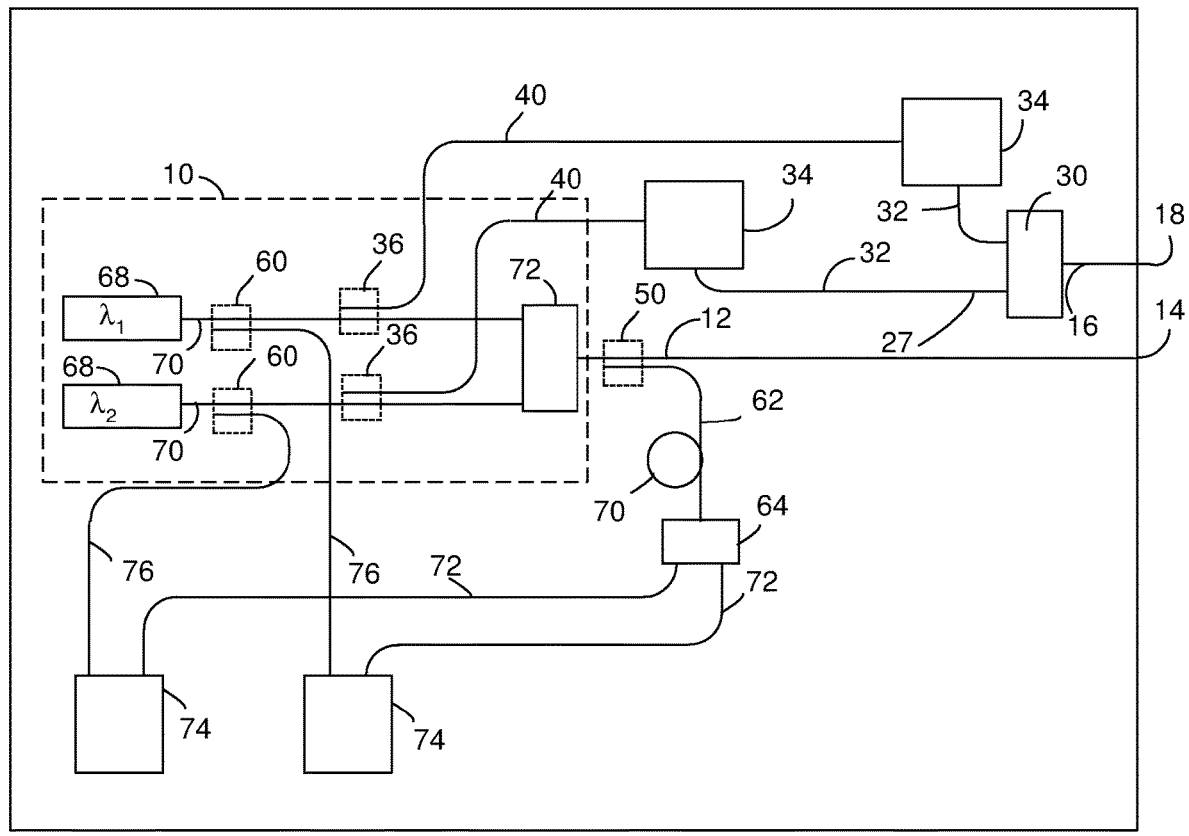
FIG. 3 is a top view of a LIDAR chip.
Figure 3:
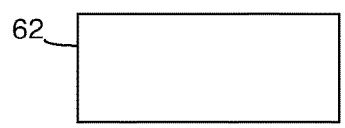

As noted above, in some instances, the second splitter 68 can be a wavelength dependent splitter configured such that the expedited sub-signals each carries a different one of the channels. Although FIG. 1A and FIG. 2 illustrate these expedited sub-signals being separated from a common signal (the expedited signal), expedited sub-signals that each carries a different one of the channels can be tapped from the source waveguides 70. For instance, FIG. 3 illustrates the LIDAR system of FIG. 1A modified to include a light source 10 constructed according to FIG. 1B. Each of the source waveguides 70 includes a splitter 60 configured to move a portion of the channel signal from a source waveguide 70 onto one of the expedited sub-waveguides 76. The portion of the channel signal received by an expedited sub-waveguide 76 serves as one of the expedited sub-signal. The expedited sub-signals each carries a different one of the channels. The expedited sub-waveguides 76 each carries one of the expedited sub-signals to one of the control components 74 as described above. Since the expedited sub-signal are not separated from the tapped signal, the delay waveguide 62 can receive the delay signal from the splitter 50 as shown in FIG. 3. For instance, the delay waveguide 62 can receive a portion of the outgoing LIDAR signal from the splitter 50. The portion of the outgoing LIDAR signal received by the delay waveguide 62 can serve as the delay signal. Suitable splitters 60 include, but are not limited to, wavelength independent splitters such as directional couplers, optical couplers, y-junctions, tapered couplers, and Multi-Mode Interference (MMI) devices.

The expedited sub-signal and the delayed channel signal received by same control component 74 each include light from the same source waveguide 70 and accordingly from the same channel signal. Light from each of the channel signals travels on one of several different delay pathways from a splitter 60 on a source waveguide 70 to one of the control components 74. Each of the delay pathways is primarily defined by the portion of a source waveguide 70 after a splitter 60, the laser multiplexer 72, the portion of the utility waveguide 12 between the laser multiplexer 72 and the splitter 50, the splitter 50, the delay waveguide 62, the first splitter 64, and one of the delayed channel waveguides 72.

Each of the delay pathways has a common portion and multiple separated portions. The common portion of each delay pathway is shared by the delay pathways. In contrast, the separated portions of a delay pathways are not shared with the other delay pathways. The light signals that travel through the common portion can carry multiple different channels. The light signals that travel through the separated portions can each carry a different channel. For instance, the portion of the utility waveguide 12 between the laser multiplexer 72 and the splitter 50, and the delay waveguide 62 are common to each of the delay pathways and serves as the common portion. In contrast, the portion of a source waveguide 70 after a splitter 60, and the delayed channel waveguides 72 are each separated from the other delayed channel waveguides 72 and serve as a separated portion.

In the LIDAR system of FIG. 3, each of the delay pathways is traveled by a delay pathway signal that is a combination of a channel signal, the outgoing LIDAR signal, the delay signal and one of the delayed channel signals. Additionally, light from each of the channel signals travels a different expedited pathway from a splitter 60 on a source waveguide 70 to one of the control components 74. The expedited pathways exclude a common portion. The expedited pathways are each defined primarily by an expedited sub-waveguide 76. Each of the expedited sub-signals serves as an expedited pathway signal that travels one of the expedited pathways.

The expedited pathways and the delayed pathways are configured such that each control component 74 receives a delayed pathway signal and an expedited pathway signal that carry the same channel (the common channel). The expedited pathways and the delayed pathways can be configured such that each of the different control components 74 receives a delayed pathway signal and an expedited pathway signal that carry a different common channel. Additionally, the delay pathways and the expedited pathways can be configured such that the delay pathway signal and/or the expedited pathway signal received at each of the control components 74 carries only one of the channels or carries essentially only one of the channels.

The components that define the delay pathways and the expedited pathways are configured such that an expedited pathway signal and a delayed pathway signal that arrive at the same the control component 74 have the arrival of the delayed pathway signal at the control component 74 delayed relative to the arrival of the expedited pathway signal at the control component 74.

Because the delayed pathway signal and the expedited pathway signal include different portions of a common signal (the channel signal), each control component 74 receives a delayed portion of the common signal and also receives an expedited portion of the common signal with the delayed portion being delayed relative to the tapped portion. The components that define the delayed pathway and the expedited pathway can be configured to provide the delay between the tapped portion and the expedited portion arriving at the control component 74. For instance, the waveguides that define the delayed pathways and the waveguide(s) that define the expedited pathways can be configured such that the delayed pathway is longer than the expedited pathway by a length that provides the delays desired at each control component 84. The length of the delay section 70 can be the primary source of the length difference between the delay pathway and the expedited pathway that lead to the same control component 74. As is evident from FIG. 3, a delay signal that carries the different channels travels through the same delay section 70. As a result, the same delay section 70 is common to each of the delay pathways and each of the channels.

Figure 4:
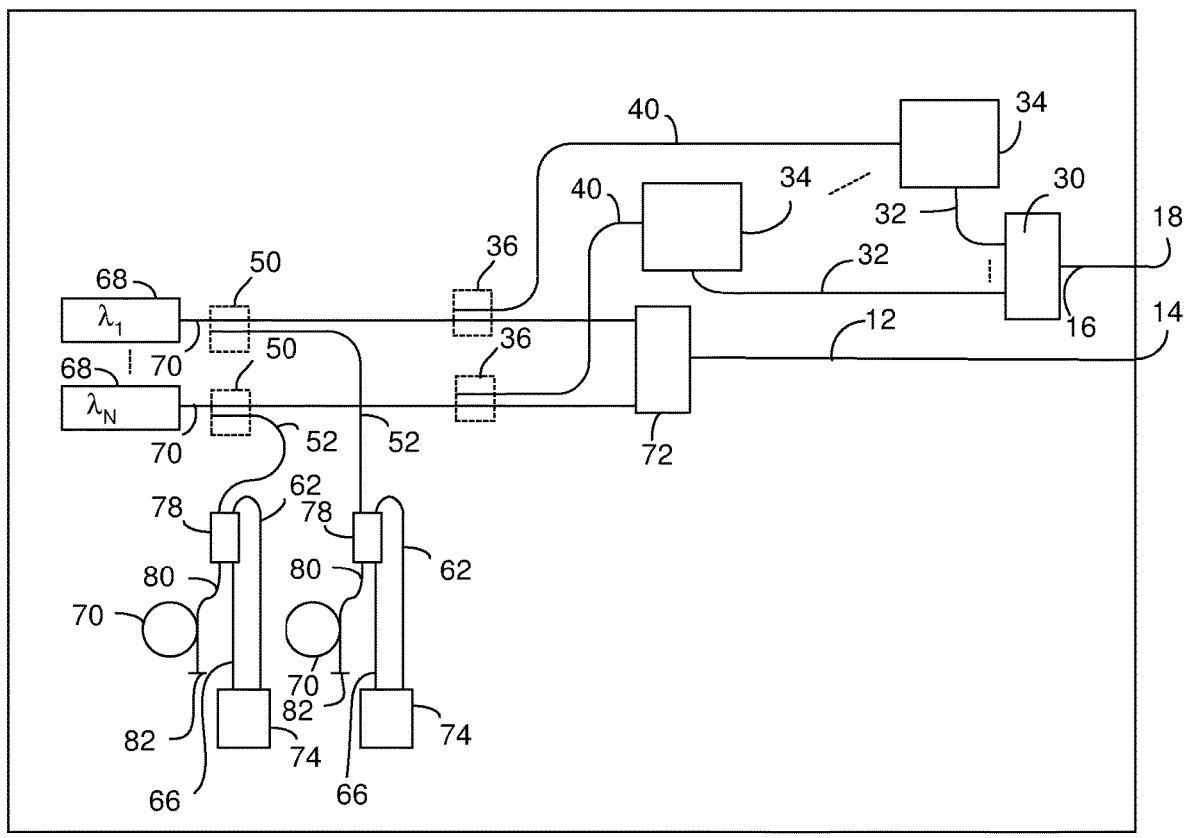
FIG. 4 is a top view of a LIDAR chip.
Figure 4:
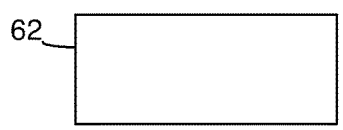

FIG. 3 illustrates a LIDAR system where the light in the expedited signals has not been separated from a common signal that carries multiple channels but the light in the delayed signals is separated from a common signal. However, the LIDAR system can be configured such that the light in the expedited signals has not been separated from a common signal and the light in the delayed signals has not been separated from a common signal. For instance, FIG. 4 illustrates the LIDAR system of FIG. 3 modified such that the light in the expedited signals and in the delayed signals has not been separated from a common signal. Each of the source waveguides 70 includes the splitter 50 and differential delay mechanism 54 disclosed in the context of FIG. 2. As a result, each of the splitter 50 is configured to move a portion of the channel signal from a source waveguide 70 onto a control waveguide 52. The portion of the channel signal received by a control waveguide 52 can serves as the tapped signal. Because each of the channel signals carries a different one of the channels, the light in each of the tapped signals carries a different one of the channels.

The tapped signals are each received at a different one of the optical couplers 78. The optical couplers 78 divide the tapped signal into the expedited signal and a first delayed signal. The expedited signals are each received on an expedited waveguide 66. Suitable optical couplers 78 include, but are not limited to, 2×2 Multi-Mode Interference (MIMI) couplers, and 2×2 directional couplers.

Each of the first delay waveguides 80 receives the first delayed signal from the splitter 60. The first delay waveguide 80 carries the first delayed signal to a return device 82. The return device 82 is configured to return the first delayed signal to the first delay waveguide 80 such that the first delayed signal travels from the return device 82 back through the first delay waveguide 80 to the splitter 60. As a result, the first delayed signal travels through the first delay waveguide 80 twice. Each of the optical couplers 78 receives a first delayed signal from the first delay waveguide 80 and outputs the first delay signal on the delay waveguide 62. The portion of the first delayed signal received on the delay waveguide 62 serves as a second delay signal carried on the delay waveguide 62. A first delay signal and the associated second delay signal can effectively serve together as a delay signal.

When the channel signals each carries a single channel, the resulting first delay signal and the second delay signal also carry a single channel. As a result, the second delay signal is not a common signal and there is no need for the first splitter 64 disclosed in the context of FIG. 1A through FIG. 3. Further, since the second delay signals carry a single channel they can each effectively serve as one of the delayed channel signals disclosed in the context of FIG. 1A through FIG. 3. As a result, each of the delay waveguides 62 can serve as a delayed channel waveguides 72 from FIG. 1A through FIG. 3 by carrying a second delay signal that serves as a delayed channel signal to one of the control components 74.

When the channel signals each carries a single channel, the resulting expedited signals also carry a single channel. As a result, each of the resulting expedited signals is not a common signal and there is no need for the second splitter 68 disclosed in the context of FIG. 1A through FIG. 3. Further, since each of the expedited signals carries a single channel they can each effectively serve as one of the expedited sub-signals disclosed in the context of FIG. 1A through FIG. 3. As a result, each of the expedited waveguides 66 can serve as an expedited sub-waveguide 76 by carrying an expedited signal that serves as an expedited sub-signal to one of the control components 74.

The expedited sub-signal and the delayed channel signal received by same control component 74 each include light from the same source waveguide 70 and accordingly from the same channel signal. Light from each of the channel signals travels on one of several different delay pathways from a splitter 50 on a source waveguide 70 to one of the control components 74. Each of the delay pathways is primarily defined by a control waveguide 52, the splitter 60, a first delay waveguide 80, and a delay waveguide 62. Each of the expedited pathways and each of the delay pathways excludes a common portion.

In the LIDAR system of FIG. 4, each of the delay pathways is traveled by a delay pathway signal that is a combination of a control signal, a first delayed signal, and a second delayed signal. Additionally, light from each of the channel signals travels a different expedited pathway from a splitter 50 on a source waveguide 70 to one of the control components 74. The expedited pathways are each defined primarily by a control waveguide 52, the splitter 60, and an expedited waveguide 66. Each of the expedited pathways is traveled by an expedited pathway signal that is a combination of a control signal, the splitter 60, and an expedited sub-signal. The expedited pathways and the delayed pathways are configured such that each control component 74 receives a delayed pathway signal and an expedited pathway signal that carry the same channel. The components that define the delay pathways and the expedited pathways are configured such that an expedited pathway signal and a delayed pathway signal that arrive at the same the control component 74 have the arrival of the delayed pathway signal at the control component 74 delayed relative to the arrival of the expedited pathway signal at the control component 74.

Because the delayed pathway signal and the expedited pathway signal include different portions of a common signal (one of the channel signals), each control component 74 receives a delayed portion of the common signal and also receives an expedited portion of the common signal with the delayed portion being delayed relative to the tapped portion. The components that define the delayed pathway and the expedited pathway can be configured to provide the delay between the tapped portion and the expedited portion arriving at the control component 74. For instance, the waveguides that define the delayed pathways and the waveguide (s) that define the expedited pathways can be configured such that the delayed pathway is longer than the expedited pathway by a length that provides the delays desired at each control component 84. The length of the delay section 70 can be the primary source of the length difference between the delay pathway and the expedited pathway that lead to the same control component 74. As is evident from FIG. 4, the first delayed signals that carry the different channels travel through different delay sections 70.

In some instances, a LIDAR chip constructed according to FIG. 1A through FIG. 4 is used in conjunction with a LIDAR adapter. In some instances, the LIDAR adapter can be physically optically positioned between the LIDAR chip and the one or more reflecting objects and/or the field of view in that an optical path that the first LIDAR input signal(s) and/or the LIDAR output signal travels from the LIDAR chip to the field of view passes through the LIDAR adapter. Additionally, the LIDAR adapter can be configured to operate on the LIDAR input signal and the LIDAR output signal such that the LIDAR input signal and the LIDAR output signal travel on different optical pathways between the LIDAR adapter and the LIDAR chip but on the same optical pathway between the LIDAR adapter and a reflecting object in the field of view.

Figure 5:
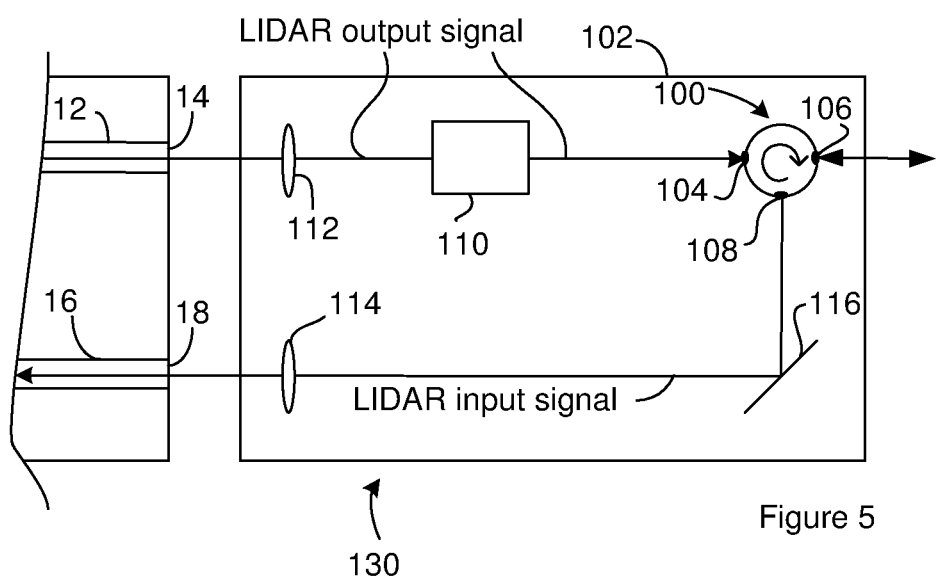
FIG. 5 is a top view of a LIDAR adapter in optical communication with an LIDAR chip.

An example of a LIDAR adapter that is suitable for use with the LIDAR chip of FIG. 1A through FIG. 4 is illustrated in FIG. 5. The LIDAR adapter includes multiple components positioned on a base. For instance, the LIDAR adapter includes a circulator 100 positioned on a base 102. The illustrated optical circulator 100 includes three ports and is configured such that light entering one port exits from the next port. For instance, the illustrated optical circulator includes a first port 104, a second port 106, and a third port 108. The LIDAR output signal enters the first port 104 from the utility waveguide 12 of the LIDAR chip and exits from the second port 106.

The LIDAR adapter can be configured such that the output of the LIDAR output signal from the second port 106 can also serve as the output of the LIDAR output signal from the LIDAR adapter and accordingly from the LIDAR system. As a result, the LIDAR output signal can be output from the LIDAR adapter such that the LIDAR output signal is traveling toward a sample region in the field of view. Accordingly, in some instances, the portion of the LIDAR output signal that has exited from the LIDAR adapter can also be considered the system output signal. As an example, when the exit of the LIDAR output signal from the LIDAR adapter is also an exit of the LIDAR output signal from the LIDAR system, the LIDAR output signal can also be considered a system output signal.

The LIDAR output signal output from the LIDAR adapter includes, consists of, or consists essentially of light from the LIDAR output signal received from the LIDAR chip. Accordingly, the system output signal output from the LIDAR adapter may be the same or substantially the same as the LIDAR output signal received from the LIDAR chip. However, there may be differences between the LIDAR output signal output from the LIDAR adapter and the LIDAR output signal received from the LIDAR chip. For instance, the LIDAR output signal can experience optical loss as it travels through the LIDAR adapter and/or the LIDAR adapter can optionally include an amplifier configured to amplify the LIDAR output signal as it travels through the LIDAR adapter.

When one or more objects in the sample region reflect the LIDAR output signal, at least a portion of the reflected light travels back to the circulator 100 as a system return signal. The system return signal enters the circulator 100 through the second port 106. FIG. 5 illustrates the LIDAR output signal and the system return signal traveling between the LIDAR adapter and the sample region along the same optical path.

The system return signal exits the circulator 100 through the third port 108 and is directed to the comparative waveguide 18 on the LIDAR chip. Accordingly, all or a portion of the system return signal can serve as the first LIDAR input signal and the first LIDAR input signal includes or consists of light from the system return signal. Accordingly, the LIDAR output signal and the first LIDAR input signal travel between the LIDAR adapter and the LIDAR chip along different optical paths.

As is evident from FIG. 5, the LIDAR adapter can include optical components in addition to the circulator 100. For instance, the LIDAR adapter can include components for directing and controlling the optical path of the LIDAR output signal and the system return signal. As an example, the adapter of FIG. 5 includes an optional amplifier 110 positioned so as to receive and amplify the LIDAR output signal before the LIDAR output signal enters the circulator 100. The amplifier 110 can be operated by the electronics 62 allowing the electronics 62 to control the power of the LIDAR output signal.

FIG. 5 also illustrates the LIDAR adapter including an optional first lens 112 and an optional second lens 114. The first lens 112 can be configured to couple the LIDAR output signal to a desired location. In some instances, the first lens 112 is configured to focus or collimate the LIDAR output signal at a desired location. In one example, the first lens 112 is configured to couple the LIDAR output signal on the first port 104 when the LIDAR adapter does not include an amplifier 110. As another example, when the LIDAR adapter includes an amplifier 110, the first lens 112 can be configured to couple the LIDAR output signal on the entry port to the amplifier 110. The second lens 114 can be configured to couple the LIDAR output signal at a desired location. In some instances, the second lens 114 is configured to focus or collimate the LIDAR output signal at a desired location. For instance, the second lens 114 can be configured to couple the LIDAR output signal the on the facet 35 of the comparative waveguide 18.

The LIDAR adapter can also include one or more direction changing components such as mirrors. FIG. 5 illustrates the LIDAR adapter including a mirror as a direction-changing component 116 that redirects the system return signal from the circulator 100 to the facet 20 of the comparative waveguide 18.

The LIDAR chips include one or more waveguides that constrains the optical path of one or more light signals. While the LIDAR adapter can include waveguides, the optical path that the system return signal and the LIDAR output signal travel between components on the LIDAR adapter and/or between the LIDAR chip and a component on the LIDAR adapter can be free space. For instance, the system return signal and/or the LIDAR output signal can travel through the atmosphere in which the LIDAR chip, the LIDAR adapter, and/or the base 102 is positioned when traveling between the different components on the LIDAR adapter and/or between a component on the LIDAR adapter and the LIDAR chip. As a result, optical components such as lenses and direction changing components can be employed to control the characteristics of the optical path traveled by the system return signal and the LIDAR output signal on, to, and from the LIDAR adapter.

Suitable bases 102 for the LIDAR adapter include, but are not limited to, substrates, platforms, and plates. Suitable substrates include, but are not limited to, glass, silicon, and ceramics. The components can be discrete components that are attached to the substrate. Suitable techniques for attaching discrete components to the base 102 include, but are not limited to, epoxy, solder, and mechanical clamping. In one example, one or more of the components are integrated components and the remaining components are discrete components. In another example, the LIDAR adapter includes one or more integrated amplifiers and the remaining components are discrete components.

Figure 6:
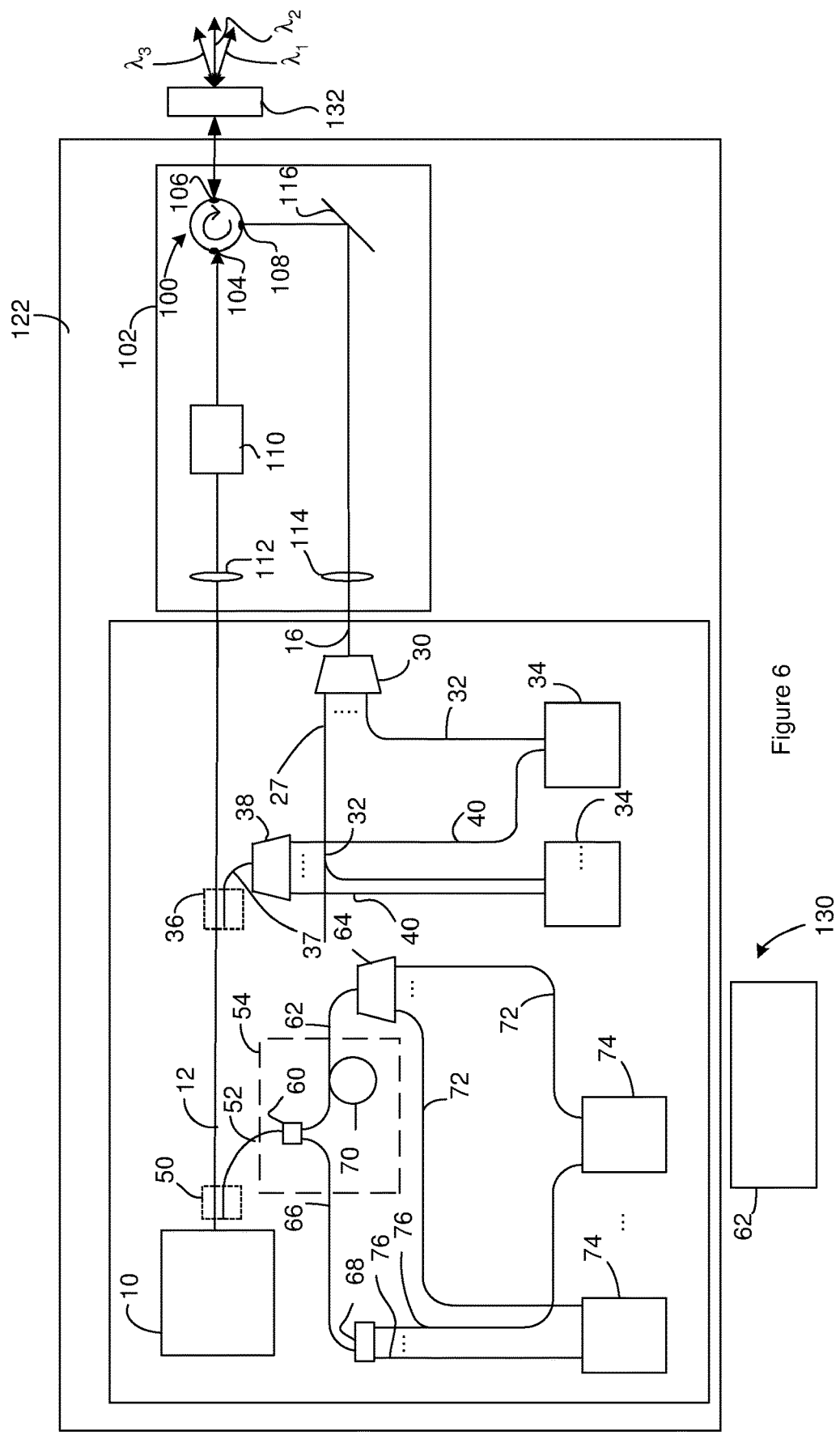
FIG. 6 is a top view of a LIDAR system that includes the LIDAR chip and electronics of FIG. 1A and the LIDAR adapter of FIG. 5 on a common support.

The LIDAR chip, electronics, and the LIDAR adapter can be positioned on a common mount. Suitable common mounts include, but are not limited to, glass plates, metal plates, silicon plates and ceramic plates. As an example, FIG. 6 is a top view of a LIDAR assembly that includes the LIDAR chip and electronics 62 of FIG. 1A and the LIDAR adapter of FIG. 3 on a common support 122. Although the electronics 62 are illustrated as being located on the common support, all or a portion of the electronics can be located off the common support. Suitable approaches for mounting the LIDAR chip, electronics, and/or the LIDAR adapter on the common support include, but are not limited to, epoxy, solder, and mechanical clamping.

A LIDAR system can include the LIDAR assembly 130 employed in conjunction with one or more additional optical components. For instance, LIDAR a system can include the LIDAR assembly 130 employed in conjunction with a directional component 132 as shown in FIG. 6.

In FIG. 6, the directional component 132 receives the LIDAR output signal output from the adapter. When the LIDAR output signal carries multiple channels, the directional component 132 separates the channels carried by the LIDAR output signal into system output signals that each carries a different one of the channels. In FIG. 6, the system output signal carrying channel i is labeled $\lambda_i$ where i represents a channel index and the channel(s) are each associated with channel a channel index i=1 through i=N. The directional component 132 can also be configured to steer each system output signal to multiple different sample regions in a field of view. Light from a system output signal can be reflected by one or more objects positioned in a sample region illuminated by the system output signal. The light returns to the LIDAR system in a system return signal. Different system return signals each carry a different one of the channels. The directional component can be configured to combine the system return signals into a returned signal that is output from the directional component and received by the LIDAR assembly and/or by the adapter.

The directional component 132 can be controlled by the electronics. As a result, the electronics can steer the system output signal(s) to different sample regions in the field of view. Although the directional component 132 is illustrated as being located off of the common support 122, the directional component 132 can be located on the common support 122 and/or on the base 102. Suitable directional components 132 include, but are not limited to, steerable optical gratings that can be reflective or transmissive, optical phased arrays (OPAs), and focal plane arrays (FPA). Examples of suitable directional components 132 are disclosed in U.S. patent application Ser. No. 17/002,756, filed on Aug. 25, 2020, entitled "Reduction of Electrical Components in LIDAR Systems" and incorporated herein in its entirety.

Figure 7A:
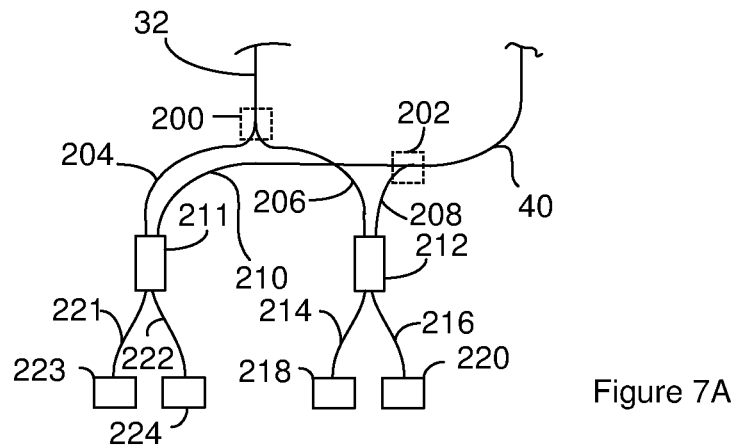
FIG. 7A illustrates an example of a processing component suitable for use with the LIDAR systems.
Figure 7B:
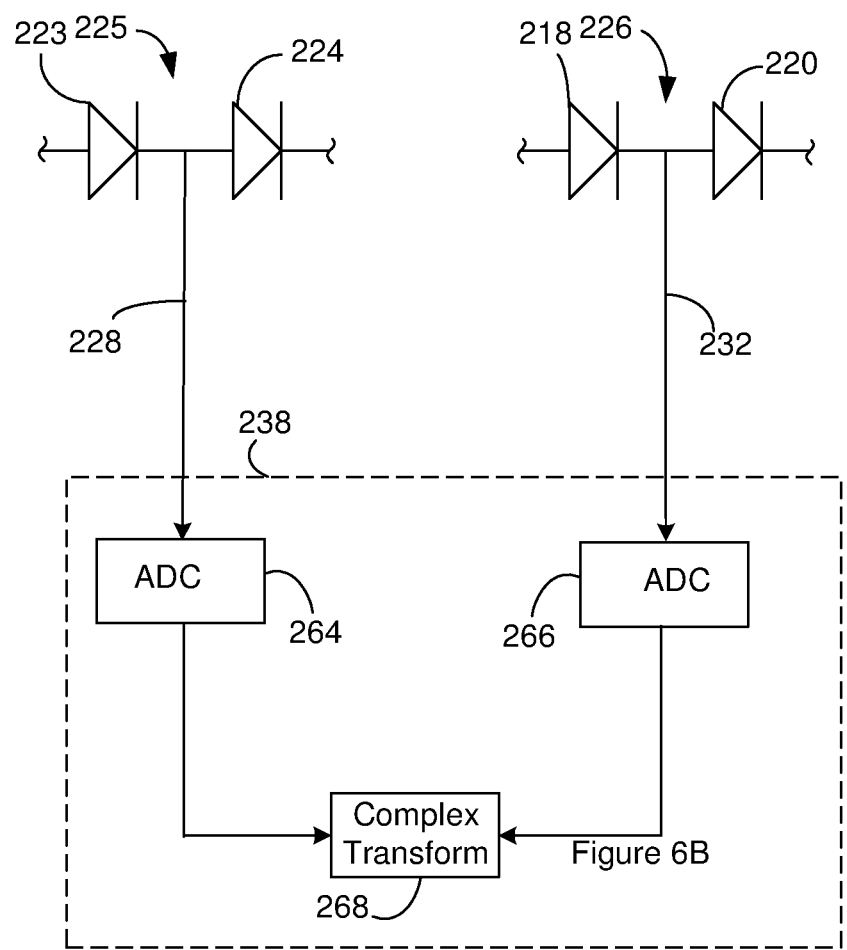
FIG. 7B provides a schematic of electronics that are suitable for use with a processing component constructed according to FIG. 7A.

FIG. 7A through FIG. 7C illustrate an example of a suitable processing component for use as all or a fraction of the processing components 34. The processing component 34 receives a comparative signal from one of the comparative waveguide 32 and a reference signal from one of the reference waveguides 40. The processing component includes a second splitter 200 that divides the comparative signal carried on the comparative waveguide 32 onto a first comparative waveguide 204 and a second comparative waveguide 206. The first comparative waveguide 204 carries a first portion of the comparative signal to the light-combining component 211. The second comparative waveguide 208 carries a second portion of the comparative signal to the second light-combining component 212.

The processing component includes a first splitter 202 that divides the reference signal carried on the reference waveguide 40 onto a first reference waveguide 204 and a second reference waveguide 206. The first reference waveguide 204 carries a first portion of the reference signal to the light-combining component 211. The second reference waveguide 208 carries a second portion of the reference signal to the second light-combining component 212.

The second light-combining component 212 combines the second portion of the comparative signal and the second portion of the reference signal into a second composite signal. Due to the difference in frequencies between the second portion of the comparative signal and the second portion of the reference signal, the second composite signal is beating between the second portion of the comparative signal and the second portion of the reference signal.

The second light-combining component 212 also splits the resulting second composite signal onto a first auxiliary detector waveguide 214 and a second auxiliary detector waveguide 216. The first auxiliary detector waveguide 214 carries a first portion of the second composite signal to a first auxiliary light sensor 218 that converts the first portion of the second composite signal to a first auxiliary electrical signal. The second auxiliary detector waveguide 216 carries a second portion of the second composite signal to a second auxiliary light sensor 220 that converts the second portion of the second composite signal to a second auxiliary electrical signal. Examples of suitable light sensors include germanium photodiodes (PDs), and avalanche photodiodes (APDs).

In some instances, the second light-combining component 212 splits the second composite signal such that the portion of the comparative signal (i.e. the portion of the second portion of the comparative signal) included in the first portion of the second composite signal is phase shifted by 180° relative to the portion of the comparative signal (i.e. the portion of the second portion of the comparative signal) in the second portion of the second composite signal but the portion of the reference signal (i.e. the portion of the second portion of the reference signal) in the second portion of the second composite signal is not phase shifted relative to the portion of the reference signal (i.e. the portion of the second portion of the reference signal) in the first portion of the second composite signal. Alternately, the second light-combining component 212 splits the second composite signal such that the portion of the reference signal (i.e. the portion of the second portion of the reference signal) in the first portion of the second composite signal is phase shifted by 180° relative to the portion of the reference signal (i.e. the portion of the second portion of the reference signal) in the second portion of the second composite signal but the portion of the comparative signal (i.e. the portion of the second portion of the comparative signal) in the first portion of the second composite signal is not phase shifted relative to the portion of the comparative signal (i.e. the portion of the second portion of the comparative signal) in the second portion of the second composite signal. Examples of suitable light sensors include germanium photodiodes (PDs), and avalanche photodiodes (APDs).

The first light-combining component 211 combines the first portion of the comparative signal and the first portion of the reference signal into a first composite signal. Due to the difference in frequencies between the first portion of the comparative signal and the first portion of the reference signal, the first composite signal is beating between the first portion of the comparative signal and the first portion of the reference signal.

The first light-combining component 211 also splits the first composite signal onto a first detector waveguide 221 and a second detector waveguide 222. The first detector waveguide 221 carries a first portion of the first composite signal to a first light sensor 223 that converts the first portion of the second composite signal to a first electrical signal. The second detector waveguide 222 carries a second portion of the second composite signal to a second light sensor 224 that converts the second portion of the second composite signal to a second electrical signal. Examples of suitable light sensors include germanium photodiodes (PDs), and avalanche photodiodes (APDs).

In some instances, the light-combining component 211 splits the first composite signal such that the portion of the comparative signal (i.e. the portion of the first portion of the comparative signal) included in the first portion of the composite signal is phase shifted by 180° relative to the portion of the comparative signal (i.e. the portion of the first portion of the comparative signal) in the second portion of the composite signal but the portion of the reference signal (i.e. the portion of the first portion of the reference signal) in the first portion of the composite signal is not phase shifted relative to the portion of the reference signal (i.e. the portion of the first portion of the reference signal) in the second portion of the composite signal. Alternately, the light-combining component 211 splits the composite signal such that the portion of the reference signal (i.e. the portion of the first portion of the reference signal) in the first portion of the composite signal is phase shifted by 180° relative to the portion of the reference signal (i.e. the portion of the first portion of the reference signal) in the second portion of the composite signal but the portion of the comparative signal (i.e. the portion of the first portion of the comparative signal) in the first portion of the composite signal is not phase shifted relative to the portion of the comparative signal (i.e. the portion of the first portion of the comparative signal) in the second portion of the composite signal.

When the second light-combining component 212 splits the second composite signal such that the portion of the comparative signal in the first portion of the second composite signal is phase shifted by 180° relative to the portion of the comparative signal in the second portion of the second composite signal, the light-combining component 211 also splits the composite signal such that the portion of the comparative signal in the first portion of the composite signal is phase shifted by 180° relative to the portion of the comparative signal in the second portion of the composite signal. When the second light-combining component 212 splits the second composite signal such that the portion of the reference signal in the first portion of the second composite signal is phase shifted by 180° relative to the portion of the reference signal in the second portion of the second composite signal, the light-combining component 211 also splits the composite signal such that the portion of the reference signal in the first portion of the composite signal is phase shifted by 180° relative to the portion of the reference signal in the second portion of the composite signal.

Suitable light-combining components 211 and second light-combining components 212 include, but are not limited to, 2×2 Multi-Mode Interference (MMI) couplers, and 2×2 directional couplers.

The first reference waveguide 210 and the second reference waveguide 208 are constructed to provide a phase shift between the first portion of the reference signal and the second portion of the reference signal. For instance, the first reference waveguide 210 and the second reference waveguide 208 can be constructed so as to provide a 90 degree phase shift between the first portion of the reference signal and the second portion of the reference signal. As an example, one reference signal portion can be an in-phase component and the other a quadrature component. Accordingly, one of the reference signal portions can be a sinusoidal function and the other reference signal portion can be a cosine function. In one example, the first reference waveguide 210 and the second reference waveguide 208 are constructed such that the first reference signal portion is a cosine function and the second reference signal portion is a sine function. Accordingly, the portion of the reference signal in the second composite signal is phase shifted relative to the portion of the reference signal in the first composite signal, however, the portion of the comparative signal in the first composite signal is not phase shifted relative to the portion of the comparative signal in the second composite signal.

The first light sensor 223 and the second light sensor 224 can be connected as a balanced detector and the first auxiliary light sensor 218 and the second auxiliary light sensor 220 can also be connected as a balanced detector. For instance, FIG. 7B provides a schematic of the relationship between the electronics, the first light sensor 223, the second light sensor 224, the first auxiliary light sensor 218, and the second auxiliary light sensor 220. The symbol for a photodiode is used to represent the first light sensor 223, the second light sensor 224, the first auxiliary light sensor 218, and the second auxiliary light sensor 220 but one or more of these sensors can have other constructions. In some instances, all of the components illustrated in the schematic of FIG. 7B are included on the LIDAR chip. In some instances, the components illustrated in the schematic of FIG. 7B are distributed between the LIDAR chip and electronics located off of the LIDAR chip.

The electronics 62 connect the first light sensor 223 and the second light sensor 224 as a first balanced detector 225 and the first auxiliary light sensor 218 and the second auxiliary light sensor 220 as a second balanced detector 226. In particular, the first light sensor 223 and the second light sensor 224 are connected in series. Additionally, the first auxiliary light sensor 218 and the second auxiliary light sensor 220 are connected in series. The serial connection in the first balanced detector is in communication with a first data line 228 that carries the output from the first balanced detector as a first data signal. The serial connection in the second balanced detector is in communication with a second data line 232 that carries the output from the second balanced detector as a second data signal. The first data signal is an electrical representation of the first composite signal and the second data signal is an electrical representation of the second composite signal. Accordingly, the first data signal includes a contribution from a first waveform and a second waveform and the second data signal is a composite of the first waveform and the second waveform. The portion of the first waveform in the first data signal is phase-shifted relative to the portion of the first waveform in the first data signal but the portion of the second waveform in the first data signal being in-phase relative to the portion of the second waveform in the first data signal. For instance, the second data signal includes a portion of the reference signal that is phase shifted relative to a different portion of the reference signal that is included the first data signal. Additionally, the second data signal includes a portion of the comparative signal that is in-phase with a different portion of the comparative signal that is included in the first data signal. The first data signal and the second data signal are beating as a result of the beating between the comparative signal and the reference signal, i.e. the beating in the first composite signal and in the second composite signal.

The electronics 62 includes a transform mechanism 238 configured to perform a mathematical transform on the first data signal and the second data signal. For instance, the mathematical transform can be a complex Fourier transform with the first data signal and the second data signal as inputs. Since the first data signal is an in-phase component and the second data signal its quadrature component, the first data signal and the second data signal together act as a complex data signal where the first data signal is the real component and the second data signal is the imaginary component of the input.

The transform mechanism 238 includes a first Analog-to-Digital Converter (ADC) 264 that receives the first data signal from the first data line 228. The first Analog-to-Digital Converter (ADC) 264 converts the first data signal from an analog form to a digital form and outputs a first digital data signal. The transform mechanism 238 includes a second Analog-to-Digital Converter (ADC) 266 that receives the second data signal from the second data line 232. The second Analog-to-Digital Converter (ADC) 266 converts the second data signal from an analog form to a digital form and outputs a second digital data signal. The first digital data signal is a digital representation of the first data signal and the second digital data signal is a digital representation of the second data signal. Accordingly, the first digital data signal and the second digital data signal act together as a complex signal where the first digital data signal acts as the real component of the complex signal and the second digital data signal acts as the imaginary component of the complex data signal.

The transform mechanism 238 includes a transform component 268 that receives the complex data signal. For instance, the transform component 268 receives the first digital data signal from the first Analog-to-Digital Converter (ADC) 264 as an input and also receives the second digital data signal from the second Analog-to-Digital Converter (ADC) 266 as an input. The transform component 268 can be configured to perform a mathematical transform on the complex signal so as to convert from the time domain to the frequency domain. The mathematical transform can be a complex transform such as a complex Fast Fourier Transform (FFT). A complex transform such as a complex Fast Fourier Transform (FFT) provides an unambiguous solution for the shift in frequency of LIDAR input signal relative to the LIDAR output signal that is caused by the radial velocity between the reflecting object and the LIDAR chip. The electronics use the one or more frequency peaks output from the transform component 268 for further processing to generate the LIDAR data (distance and/or radial velocity between the reflecting object and the LIDAR chip or LIDAR system). The transform component 268 can execute the attributed functions using firmware, hardware or software or a combination thereof.

FIG. 7C shows an example of a relationship between the frequency of the system output signal(s), time, cycles and data periods. The frequency versus time pattern is shown for two of the system output signals carrying different channels. The system output signal carrying channel i is labeled $\lambda_i$ where i represents the channel index. The base frequency of the system output signal ($f_o$) can be the lowest frequency of the system output signal during a cycle.

The frequency versus time patterns are shown for a sequence of two cycles labeled $cycle_j$ and $cycle_{j+1}$. In some instances, the frequency versus time pattern is repeated in each cycle as shown in FIG. 7C. The illustrated cycles do not include re-location periods and/or re-location periods are not located between cycles. As a result, FIG. 7C illustrates the results for a continuous scan of the system output signal(s).

Each cycle includes K data periods that are each associated with a period index k and are labeled $DP_k$. In the example of FIG. 7C, each cycle includes two data periods labeled $DP_k$ with k=1 and 2. In some instances, the frequency versus time pattern is the same for the data periods that correspond to each other in different cycles as is shown in FIG. 7C. Corresponding data periods are data periods with the same period index. As a result, each data period $DP_1$ can be considered corresponding data periods and the associated frequency versus time patterns are the same in FIG. 7C. At the end of a cycle, the electronics return the frequency to the same frequency level at which it started the previous cycle.

During the data period $DP_1$, and the data period $DP_2$, the electronics operate the light source that generates the channel signal carrying channel $\lambda_i$ such that the frequency of the system output signal changes at a linear rate $\alpha_i$ where i represents the channel index. The direction of the frequency change during the data period $DP_1$ is the opposite of the direction of the frequency change during the data period $DP_2$.

During each cycle, the system output signal that carries channel i illuminates a sample region labeled $SR_{k,i}$ where k represents a sample region index and i represents the channel index. For instance, during the cycle labeled j in FIG. 7C, the sample region $SR_{k,i}$ is illuminated by the system output signal carrying channel $\lambda_i$ and the sample region $SR_{k,i+1}$ is illuminated by the system output signal carrying channel $\lambda_{i+1}$. The sample region indices k can be assigned relative to time. For instance, the samples regions can be illuminated by the system output signal in the sequence indicated by the index k. As a result, the sample region $SR_{10,1}$ can be illuminated after sample region $SR_{9,1}$ and before $SR_{11,1}$.

As is evident from the above discussion, each processing component 34 receives a comparative signal and a reference signal carrying the same channel. As a result, the frequency output from the Complex Fourier transform associated with a processing component 34 represents the beat frequency of a composite signal that includes a comparative signal beating against a reference signal where the comparative signal and the reference signal carry the same channel. The beat frequencies from the same processing component 34 and from two or more different data periods can be combined to generate the LIDAR data for one of the sample regions. For instance, the processing component 34 that receives the comparative signal and reference signal carrying channel $\lambda_i$ can combine the beat frequency generated from $DP_1$ in cycle j with the beat frequency generated from $DP_2$ in cycle j to generate the LIDAR data for the sample region $SR_{k,i}$. As an example, the following equation applies during a data period where electronics increase the frequency of the outgoing LIDAR signal during the data period such as occurs in data period $DP_1$ of FIG. 7C: $f_{ub} = -f_d + \alpha_i \tau$ where $f_{ub}$ is the frequency provided by the transform component 268, $f_d$ represents the Doppler shift ($f_d = 2vf_c/c$) where $f_c$ represents the base frequency ($f_o$), c represents the speed of light, v is the radial velocity between the reflecting object and the LIDAR system where the direction from the reflecting object toward the LIDAR system is assumed to be the positive direction, c is the speed of light, and $\tau$ represents the time for the system output signal to exit from the LIDAR system, be reflected by an object located outside of the LIDAR system and the reflected light to return the LIDAR system in a system return signal (the roundtrip time). The following equation applies during a data period where electronics decrease the frequency of the outgoing LIDAR signal such as occurs in data period $DP_2$ of FIG. 7C: $f_{db} = -f_d - \alpha_i * \tau$ where $f_{db}$ is a frequency provided by the transform component 268. In these two equations, $f_d$ and $\tau$ are unknowns. The electronics solve these two equations for the two unknowns. The radial velocity for the sample region illuminated by the system output signal carrying channel $\lambda_i$ can then be quantified from the Doppler shift ($v = c * f_d/(2f_c)$) and/or the separation distance for that sample region can be quantified from $C * \tau / 2$.

In some instances, more than one object is present in a sample region. In some instances when more than one object is present in a sample region, the transform may output more than one frequency where each frequency is associated with a different object. The frequencies that result from the same object in different data periods of the same cycle can be considered corresponding frequency pairs. LIDAR data can be generated for each corresponding frequency pair output by the transform. As a result separate LIDAR data can be generated for each of the objects in a sample region.

Although FIG. 7A through FIG. 7B illustrate light-combining components that combine a portion of the reference signal with a portion of the comparative signal, the processing component can include a single light-combining component that combines the reference signal with the comparative signal so as to form a composite signal. As a result, at least a portion of the reference signal and at least a portion of the comparative signal can be combined to form a composite signal. The combined portion of the reference signal can be the entire reference signal or a fraction of the reference signal and the combined portion of the comparative signal can be the entire comparative signal or a fraction of the comparative signal.

As an example of a processing component that combines the reference signal and the comparative signal so as to form a composite signal, FIG. 7D through FIG. 7E illustrate the processing component of FIG. 7A through FIG. 7B modified to include a single light-combining component. The comparative waveguide 196 carries the comparative signal directly to the first light-combining component 211 and the reference waveguide 198 carries the reference signal directly to the first light-combining component 211.

The first light-combining component 211 combines the comparative signal and the reference signal into a composite signal. Due to the difference in frequencies between the comparative signal and the reference signal, the first composite signal is beating between the comparative signal and the reference signal. The first light-combining component 211 also splits the composite signal onto the first detector waveguide 221 and the second detector waveguide 222. The first detector waveguide 221 carries a first portion of the composite signal to the first light sensor 223 that converts the first portion of the second composite signal to a first electrical signal. The second detector waveguide 222 carries a second portion of the composite signal to the second light sensor 224 that converts the second portion of the second composite signal to a second electrical signal.

FIG. 7E provides a schematic of the relationship between the electronics, the first light sensor 223, and the second light sensor 224. The symbol for a photodiode is used to represent the first light sensor 223, and the second light sensor 224 but one or more of these sensors can have other constructions. In some instances, all of the components illustrated in the schematic of FIG. 7E are included on the LIDAR chip. In some instances, the components illustrated in the schematic of FIG. 7E are distributed between the LIDAR chip and electronics located off of the LIDAR chip.

The electronics connect the first light sensor 223 and the second light sensor 224 as a first balanced detector 225. In particular, the first light sensor 223 and the second light sensor 224 are connected in series. The serial connection in the first balanced detector is in communication with a first data line 228 that carries the output from the first balanced detector as a first data signal. The first data signal is an electrical representation of the composite signal.

The electronics 62 include a transform mechanism 238 configured to perform a mathematical transform on the first data signal. The mathematical transform can be a real Fourier transform with the first data signal as an input. The electronics can use the frequency output from the transform as described above to extract the LIDAR data.

Each of the balanced detectors disclosed in the context of FIG. 7A through FIG. 7E can be replaced with a single light sensor. As a result, the processing component can include one or more light sensors that each receives at least a portion of a composite signal in that the received portion of the composite signal can be the entire composite signal or a fraction of the composite signal.

As discussed in the context of FIG. 7C, the electronics 62 tune the frequency of the system output signal. One method to produce this frequency chirp is to modulate the electrical current applied to the light source by the electronics. In semiconductor lasers that can be used as the light source in the LIDAR system, current modulation results in frequency modulation via strong nonlinear carrier/photon coupling.

Figure 8A:
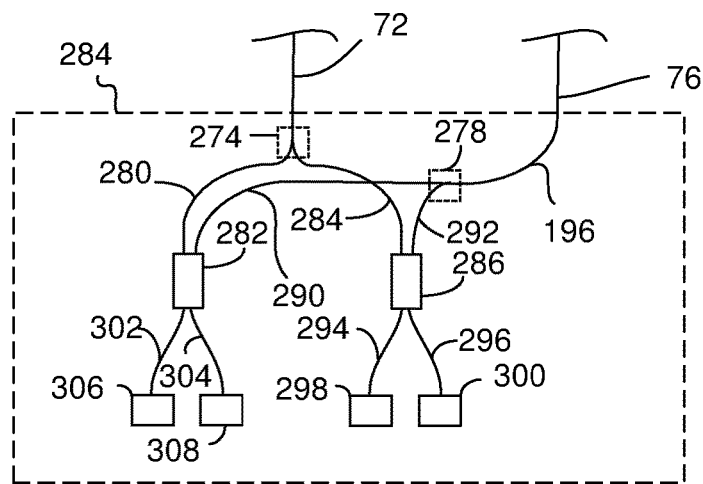
FIG. 8A and FIG. 8B illustrate an example of a suitable control component for use as all or a fraction of the control components disclosed in the context of FIG. 1A through FIG. 4.
Figure 8B:
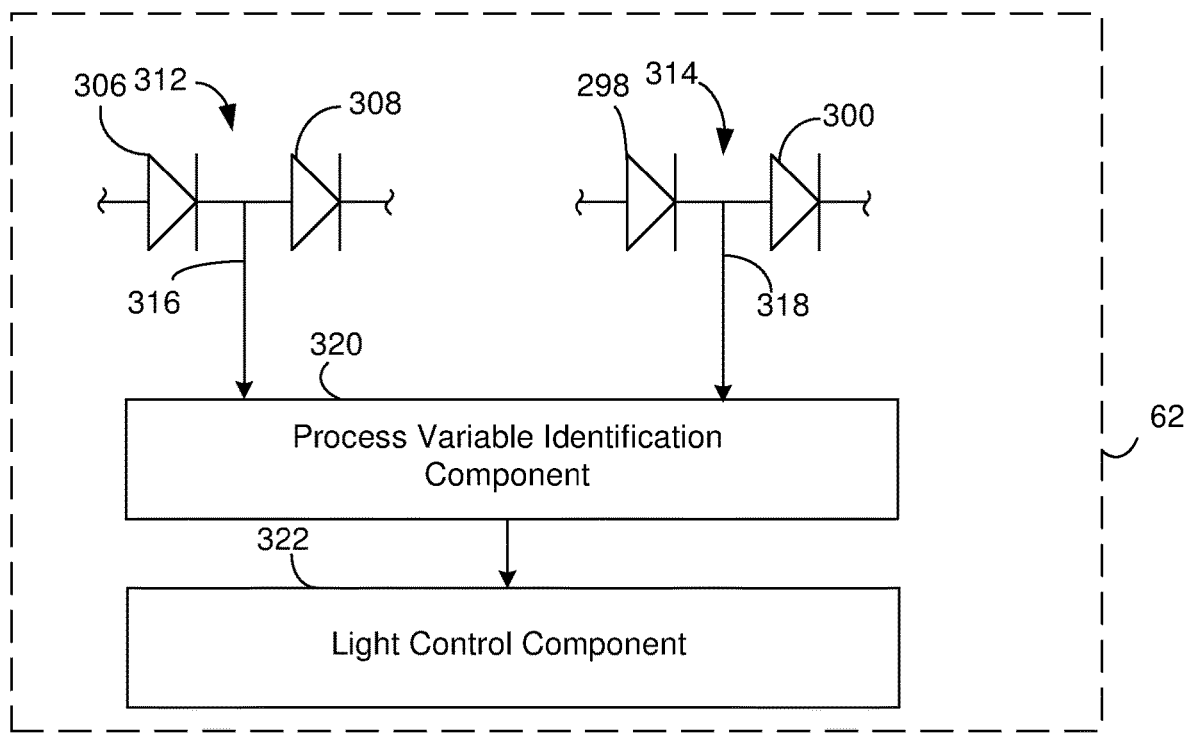

FIG. 8A and FIG. 8B illustrate an example of a suitable control component for use as all or a fraction of the control component 74 disclosed in the context of FIG. 1A through FIG. 4. As discussed above, each of the control component 74 receives a delay pathway signal from a delayed channel waveguide 72 and a delay pathway signal from a delayed channel waveguide 72 and an expedited pathway signal from an expedited sub-waveguide 76. The delay pathway signal and the expedited pathway signal received at a control component 74 carry the same channel labeled $\lambda_i$.

The delayed channel waveguide 72 carries the delayed pathway signal to a first splitter 274. The expedited sub-waveguide 76 carries the expedited pathway signal to a second splitter 278. Suitable splitters for uses as the first splitter 274 and the second splitter 278 include, but are not limited to, wavelength independent splitters such as directional couplers, optical couplers, y-junctions, tapered couplers, and Multi-Mode Interference (MMI) devices.

The first splitter 274 divides the delayed pathway signal into a first portion of a delayed signal and a second portion of a delayed signal. A first delayed waveguide 280 carries the first portion of the delayed signal to a first light-combining component 282. A second delayed waveguide 284 carries the second portion of the delayed signal to a second light-combining component 286.

The second splitter 278 divides the expedited signal into a first portion of an expedited signal and a second portion of an expedited signal. A first expedited waveguide 290 carries the first portion of the expedited signal to the first light-combining component 282. A second expedited waveguide 292 carries the second portion of the expedited signal to the second light-combining component 286.

The first light-combining component 282 combines the first portion of the expedited signal and the first portion of the delayed signal into a first beating signal. Additionally, the second light-combining component 286 combines the second portion of the expedited signal and the second portion of the delayed signal into a second beating signal. As a result, each of the delayed pathways extends from a splitter to a light-combiner that combines light from one of the delayed pathway signals with light from one of the expedited pathway signals.

As noted above, the length of the delay pathway exceeds the length of the expedited pathway. As a result, the second portion of the delayed signal is delayed relative to the second portion of the expedited signal. Because the electronics can tune the frequency of the outgoing LIDAR signal, the delay causes the second portion of the delayed signal to have a different frequency than the second portion of the expedited signal. Due to the difference in frequencies between the second portion of the expedited signal and the second portion of the delayed signal, the second beating signal is beating between the second portion of the expedited signal and the second portion of the delayed signal.

The second light-combining component 286 also splits the second beating signal onto a first auxiliary detector waveguide 294 and a second auxiliary detector waveguide 296. The first auxiliary detector waveguide 294 carries a first portion of the second beating signal to a first auxiliary light sensor 298 that converts the first portion of the second beating signal to a first auxiliary electrical signal. The second auxiliary detector waveguide 296 carries a second portion of the second beating signal to a second auxiliary light sensor 300 that converts the second portion of the second beating signal to a second auxiliary electrical signal. Examples of suitable light sensors include germanium photodiodes (PDs), and avalanche photodiodes (APDs).

In some instances, the second light-combining component 286 splits the second beating signal such that the portion of the expedited signal (i.e. the portion of the second portion of the expedited signal) included in the first portion of the second beating signal is phase shifted by 180° relative to the portion of the expedited signal (i.e. the portion of the second portion of the expedited signal) in the second portion of the second beating signal but the portion of the delayed signal (i.e. the portion of the second portion of the delayed signal) in the second portion of the second beating signal is not phase shifted relative to the portion of the delayed signal (i.e. the portion of the second portion of the delayed signal) in the first portion of the second beating signal.

As noted above, the length of the delay pathway exceeds the length of the expedited pathway. As a result, the first portion of the delayed signal is delayed relative to the first portion of the expedited signal. The delay causes the first portion of the delayed signal to have a different frequency than the first portion of the expedited signal. Due to the difference in frequencies between the first portion of the expedited signal and the first portion of the delayed signal, the first beating signal is beating between the second portion of the expedited signal and the second portion of the delayed signal.

The first light-combining component 282 also splits the first beating signal onto a first detector waveguide 302 and a second detector waveguide 304. The first detector waveguide 302 carries a first portion of the first beating signal to a first light sensor 306 that converts the first portion of the second beating signal to a first electrical signal. The second detector waveguide 304 carries a second portion of the second beating signal to a second light sensor 308 that converts the second portion of the second beating signal to a second electrical signal. Examples of suitable light sensors include germanium photodiodes (PDs), and avalanche photodiodes (APDs).

In some instances, the first light-combining component 282 splits the first beating signal such that the portion of the expedited signal (i.e. the portion of the first portion of the expedited signal) included in the first portion of the beating signal is phase shifted by 180° relative to the portion of the expedited signal (i.e. the portion of the first portion of the expedited signal) in the second portion of the beating signal but the portion of the delayed signal (i.e. the portion of the first portion of the delayed signal) in the first portion of the beating signal is not phase shifted relative to the portion of the delayed signal (i.e. the portion of the first portion of the delayed signal) in the second portion of the beating signal.

When the second light-combining component 286 splits the second beating signal such that the portion of the expedited signal in the first portion of the second beating signal is phase shifted by 180° relative to the portion of the expedited signal in the second portion of the second beating signal, the first light-combining component 282 also splits the beating signal such that the portion of the expedited signal in the first portion of the beating signal is phase shifted by 180° relative to the portion of the expedited signal in the second portion of the beating signal.

The first delayed waveguide 280, the second delayed waveguide 284, the first expedited waveguide 80, and the second expedited waveguide 292 can be configured such that the first beating signal and the second beating signal together act as an in-phase component and quadrature component of an optical process variable signal where the first beating signal is the in-phase component of the optical process variable signal and the second beating signal is the quadrature component of the optical process variable signal or such that the second beating signal is the in-phase component of the optical process variable signal and the first beating signal is the quadrature component of the optical process variable signal. For instance, the first delayed waveguide 280 and the second delayed waveguide 284 can be constructed to provide a phase shift between the first portion of the delayed signal and the second portion of the delayed signal while the first expedited waveguide 80 and the second expedited waveguide 292 are constructed such that the first portion of the expedited signal and the second portion of the expedited signal are in phase. As an example, the first delayed waveguide 280 and the second delayed waveguide 284 can be constructed so as to provide a 90° phase shift between the first portion of the delayed signal and the second portion of the delayed signal. Accordingly, one of the delayed signal portions can be a sinusoidal function and the other delayed signal portion can be a cosine function operating on the same argument as the sinusoidal function. In one example, the first delayed waveguide 280 and the second delayed waveguide 284 are constructed such that the first portion of the delayed signal is a cosine function and the second portion of the delayed signal is a sine function. In this example, the portion of the delayed signal in the second beating signal is phase shifted relative to the portion of the delayed signal in the first beating signal, however, the portion of the expedited signal in the first beating signal is not phase shifted relative to the portion of the expedited signal in the second beating signal.

In another example, the first delayed waveguide 280 and the second delayed waveguide 284 are constructed such that the first portion of the delayed signal and the second portion of the delayed signal are in phase while the first expedited waveguide 80 and the second expedited waveguide 292 are constructed to provide a phase shift between the first portion of the expedited signal and the second portion of the expedited signal. As an example, the first expedited waveguide 80 and the second expedited waveguide 292 can be constructed so as to provide a 90° phase shift between the first portion of the expedited signal and the second portion of the expedited signal. Accordingly, one of the expedited signal portions can be a sinusoidal function and the other expedited signal portion can be a cosine function operating on the same argument as the sinusoidal function. In one example, the first expedited waveguide 80 and the second expedited waveguide 292 are constructed such that the first portion of the expedited signal is a cosine function and the second portion of the expedited signal is a sine function operating on the same argument as the cosine function. In this example, the portion of the expedited signal in the second beating signal is phase shifted relative to the portion of the expedited signal in the first beating signal, however, the portion of the delayed signal in the first beating signal is not phase shifted relative to the portion of the delayed signal in the second beating signal.

The first light sensor 306 and the second light sensor 308 can be connected as a balanced detector and the first auxiliary light sensor 298 and the second auxiliary light sensor 300 can also be connected as a balanced detector. For instance, FIG. 8B provides a schematic of the relationship between the electronics 62, the first light sensor 306, the second light sensor 308, the first auxiliary light sensor 298, and the second auxiliary light sensor 300. The symbol for a photodiode is used to represent the first light sensor 306, the second light sensor 308, the first auxiliary light sensor 298, and the second auxiliary light sensor 300 but one or more of these sensors can have other constructions. In some instances, all of the components illustrated in the schematic of FIG. 8B are included on the LIDAR chip. In some instances, the components illustrated in the schematic of FIG. 8B are distributed between the LIDAR chip and electronics located off of the LIDAR chip.

The electronics 62 connect the first light sensor 306 and the second light sensor 308 as a first balanced detector 312 and the first auxiliary light sensor 298 and the second auxiliary light sensor 300 as a second balanced detector 314. In particular, the first light sensor 306 and the second light sensor 308 are connected in series. Additionally, the first auxiliary light sensor 298 and the second auxiliary light sensor 300 are connected in series. The serial connection in the first balanced detector is in communication with a first data line 316 that carries the output from the first balanced detector as a first process variable signal. The serial connection in the second balanced detector is in communication with a second data line 318 that carries the output from the second balanced detector as a second process variable signal.

The first process variable signal is an electrical representation of the first beating signal and the second process variable signal is an electrical representation of the second beating signal. Accordingly, the first process variable signal is beating and the second process variable signal is beating. Additionally, the first process variable signal and the second process variable signal can each carry a different one of the components selected from a group consisting of the in-phase component of a process variable signal and the quadrature component of the process variable signal. For instance, the first process variable signal can include a contribution from a first waveform and a second waveform and the second process variable signal can include a contribution from the first waveform and the second waveform. The portion of the first waveform in the first process variable signal is phase-shifted relative to the portion of the first waveform in the second process variable signal but the portion of the second waveform in the first process variable signal is in-phase relative to the portion of the second waveform in the second process variable signal. For instance, the second process variable signal can include a portion of the delayed signal that is phase shifted relative to a different portion of the delayed signal that is included the first process variable signal. Additionally, the second process variable signal can include a portion of the expedited signal that is in-phase with a different portion of the expedited signal that is included in the first process variable signal. The first process variable signal and the second process variable signal are each beating as a result of the beating between the expedited signal and the delayed signal, i.e. the beating in the first beating signal and in the second beating signal.

The electronics 62 include a process variable identification component 320 that receives the process variable signal. The process variable identification component 320 uses the process variable signal to output an indicator signal that indicates, is a function of, and/or can be used to determine the frequency of the channel signal ($f_{CS}$) that carries the channel received by the control component 74 that includes the process variable identification component 320. In some instances, the indicator signal is an analog signal with one or more characteristics that are related to the frequency of the channel signal ($f_{CS}$). In some instances, the indicator signal is a digital signal that quantifies the frequency of the channel signal ($f_{CS}$), is related to the frequency of the channel signal ($f_{CS}$), or can be used to quantify the frequency of the channel signal ($f_{CS}$). Because a system output signal carrying channel $\lambda_i$ is a portion of the channel LIDAR signal carrying channel $\lambda_i$, the frequency of the channel signal can represent the value of the frequency for the outgoing LIDAR signal and/or for the system output signal carrying channel $\lambda_i$.

The electronics can include a light control component 322 that receives the indicator signal. The light control component 322 can control the laser source 68 (FIG. 1B) that is the source of the channel received by the control component 74 in response to the indicator signal. For instance, the laser source 68 can be controlled in a control architecture where the frequency of the channel signal output by the laser source 68 serves as a control process variable. When the control process variable is the frequency of the channel signal, the desired frequency for the system output signal serves as the reference variable. Because the frequency for the system output signal is modulated, the desired frequency for the system output signal changes as a function of time. For triangular modulation, FIG. 7C can represent an example of the desired waveform. FIG. 7C illustrates the desired frequency of the channel signal, and accordingly the resulting system output signal, as a linear function of time. Accordingly, the control component 74, process variable identification component 320, and light control component 322 that receive channel $\lambda_i$ can be part of a control mechanism that controls the laser source 68 that is the source of channel $\lambda_i$ such that the frequency of the channel signal output from the laser source 68 substantially maintains the desired waveform. Suitable control mechanisms include, but are not limited to, control architectures that make use of feedback control and/or feed forward control. Accordingly, the control mechanism can be a feedback control loop and/or can include a control loop.

The light control component 322 can control the characteristics of the channel signal and/or system output signal, in response to the value of an error signal determined from the value of the control process variable at a particular point in time and the value of the reference variable at the same point in time. For instance, the light control component 322 can control the characteristics of the channel signal so as to reduce the value of the error signal. As an example, the light control component 322 can control the characteristics of the channel signal such that the value of the control process variable moves toward to the value of the reference variable. In some instances, the control mechanism is a control loop such as a feedback control loop. When the control mechanism is a feedback control loop, the error signal for the control mechanism can be equal to the difference between the value of the control process variable and the value of the reference variable at a particular point in time.

When the process variable is the frequency of the channel signal, the light control component 322 can transmit a light control signal that tunes the frequency of the channel signal. For instance, the light control component 322 can tune the frequency of the channel signal by transmitting a light control signal that changes the level of electrical current through the laser source that outputs the channel signal. Other light control signals are possible. For instance, when the laser source is an electrostatic MEMS tunable laser, the light control component 322 can tune the frequency of the channel signal by transmitting a light control signal that changes the level of voltage that moves the MEMS facet of the MEMS tunable laser.

In some instances, the light control component 322 and/or the process variable identification component 320 actually quantify the frequency of the channel signal ($f_{CS}$); however, this quantification is not necessary. For instance, when the indicator signal is an analog signal that includes a characteristic that is related to the frequency of the channel signal ($f_{CS}$), the light control signal can be derived directly from the indicator signal without actually quantifying the frequency of the channel signal ($f_{CS}$). For instance, the control signal may be a one-to-one function of the indicator signal and/or of a transformed signal discussed below. As an example, the control signal may be a one-to-one function of the instantaneous frequency.

Figure 8C:
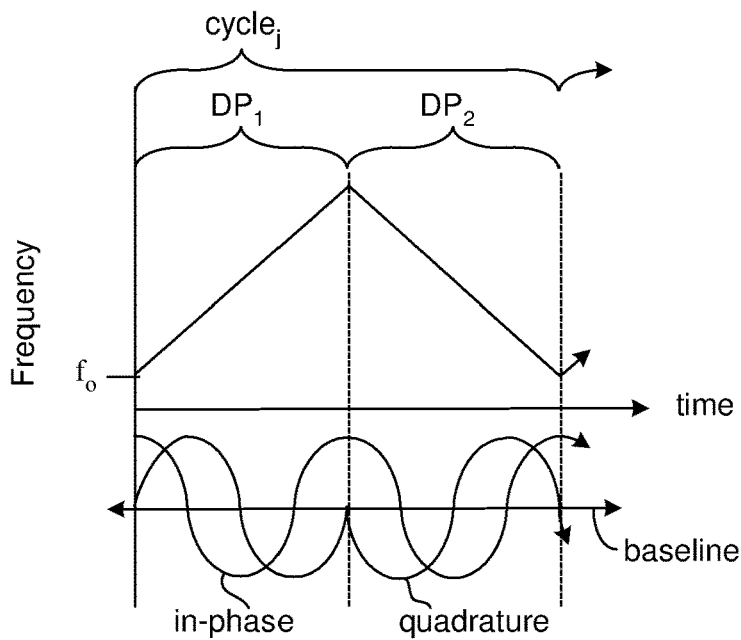
FIG. 8C is a graph showing an amplitude for an in-phase and quadrature components of a signal on the same time axis with the frequency of the system output signal.

FIG. 8C illustrates the amplitude for the in-phase and quadrature components of the optical process variable signal and/or the process variable signal on the same time axis with the frequency of the system output signal. For instance, FIG. 8C can compare the frequency of the system output signal during the first two data periods shown in FIG. 7C compared against the variation of the in-phase and quadrature components of the optical process variable signal and/or the process variable signal. Although FIG. 8C illustrates the optical process variable signal and/or the process variable signal having only one period per data period, the optical process variable signal and/or the process variable signal can have more than one period per data period.

Figure 8D:
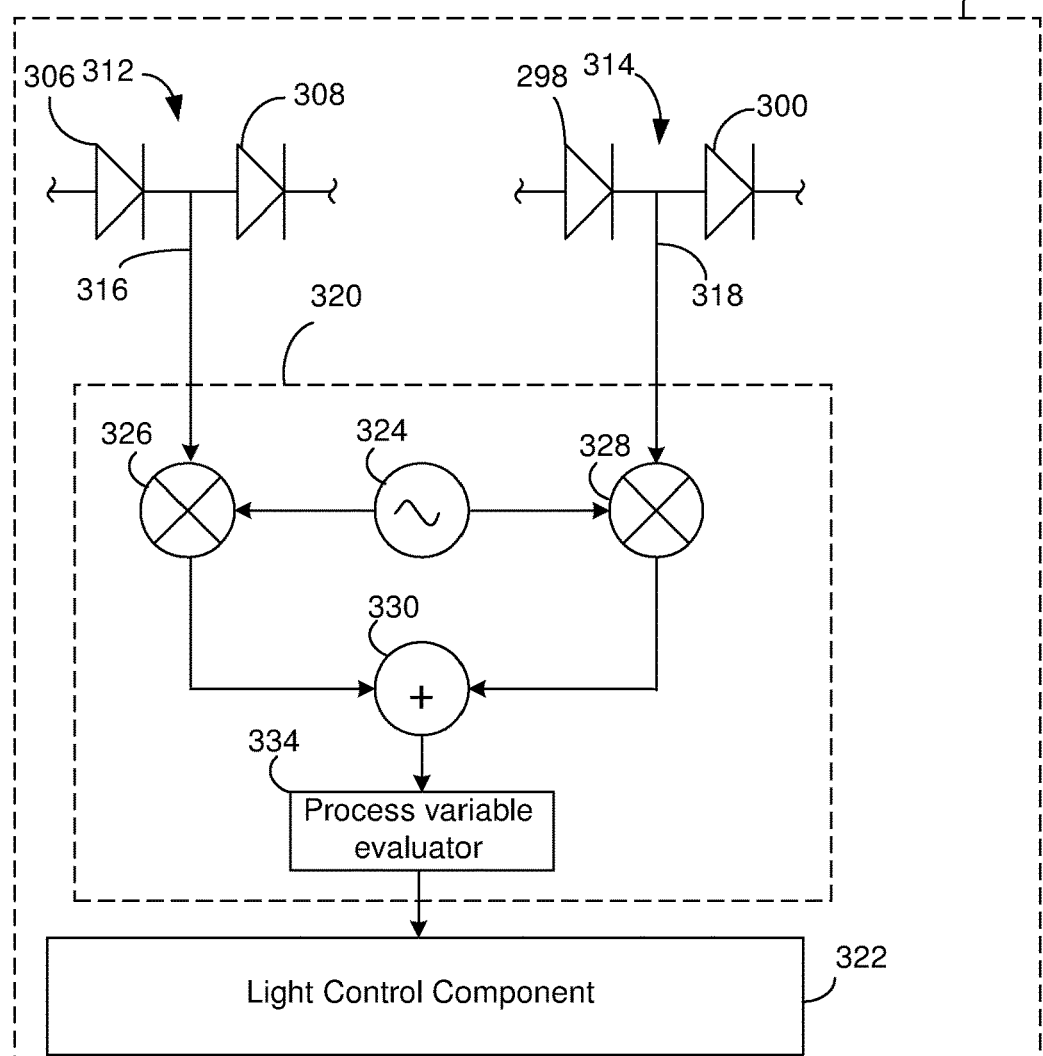
FIG. 8D illustrates one example of a process variable identification component suitable for use in the electronics of a LIDAR system.

A variety of process variable identification components 320 can be used to determine a value for the process variable indicator. FIG. 8D illustrates one example of a process variable identification component 320 that is suitable for use when the process variable is the frequency of a channel signal and/or a system output signal. The illustrated process variable identification component 320 includes a local oscillator 324 that outputs a local signal that includes first local signal and a second local signal. The first local signal and the second local signal each carries a different one of the components selected from the group consisting of an in-phase component of the local signal and a quadrature component of the local signal.

The process variable identification component 320 also includes a first multiplier 326 that receives the first process variable signal and the first local signal. The first multiplier 326 multiplies the first process variable signal and the first local signal. When the first process variable signal carries the in-phase component of the process variable signal, the first local signal carries the quadrature component of the local signal. When the first process variable signal carries the quadrature component of the process variable signal, the first local signal carries the in-phase component of the local signal. The first multiplier 326 outputs a first multiplied signal.

The process variable identification component 320 also includes a second multiplier 328 that receives the second process variable signal and the second local signal. The second multiplier 328 multiplies the second process variable signal and the second local signal. When the second process variable signal carries the in-phase component of the process variable signal, the second local signal carries the quadrature component of the local signal. When the second process variable signal carries the quadrature component of the process variable signal, the second local signal carries the in-phase component of the local signal. The second multiplier 326 outputs a second multiplied signal.

The process variable identification component 320 includes an adder 330 that receives the first multiplied signal and the second multiplied signal. The adder 330 adds the first multiplied signal and the second multiplied signal and outputs a control signal.

The control signal is received at a process variable evaluator 334. The process variable evaluator 334 uses the control signal to output an indicator signal with one or more characteristics that are related to the frequency of the channel signal ($f_{CS}$). For instance, the process variable evaluator 334 can be a Time-to-Digital Converter (TDC) that outputs an indicator signal with a voltage that is related to the frequency of the channel signal ($f_{CS}$). In some instances, the Time-to-Digital Converter (TDC) outputs an indicator signal with a voltage that is proportional to the frequency of the channel signal ($f_{CS}$). The indicator signal can be received by the light control component 322 for use in controlling the frequency of the laser source.

Another example of a suitable process variable evaluator 334 is a frequency counter that outputs an indicator signal that indicates a time between baseline crossings (dn) of the control signal. The frequency determined for the channel signal ($f_{CS}$) can be related to the time between baseline crossings (dn) by Equation 1: $f_{TS}=f_{LO}-1/(2*dn)$ where $f_{LO}$ represents the frequency of the local oscillator. The process variable evaluator 334 can output an indicator signal that carries data indicating a value of the frequency determined for the channel signal ($f_{CS}$). The indicator signal can be received by the light control component 322 for use in controlling the frequency of the laser source.

The local signal is selected such that the frequency of the control signal is higher than the frequency of the process variable signal. The increased frequency of the control signal increases the frequency that the process variable can be accurately sampled. Increasing this sampling frequency provides more accurate control of the process variable by the control mechanism. As a result, the increased frequency of the control signal enhances the control of the process variable by the control mechanism. Suitable sampling frequencies include, but are not limited to, sampling frequencies greater than 100 times the modulation frequency, where the modulation frequency is 1/(duration of a cycle). In some instances, all or a portion of the data periods in each cycle have a sampling frequency greater than 30 or 100 times per duration of the data period. In some instances, the local signal is selected such that the frequency of the control signal is more than 100, and less than 10,000 times higher than the frequency of the process variable signal.

Figure 8E:
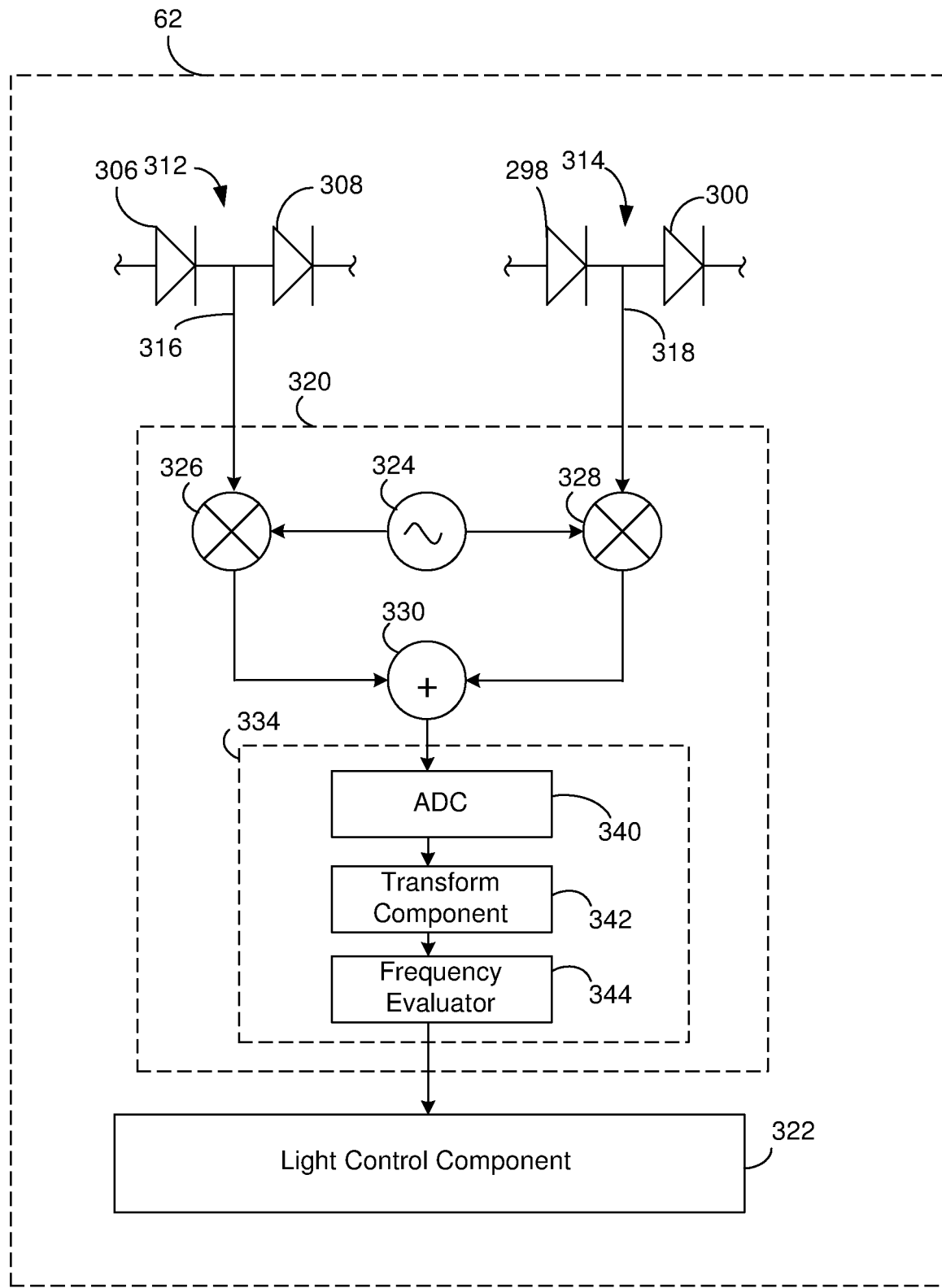
FIG. 8E illustrates another example of a process variable identification component suitable for use in the electronics of a LIDAR system.

FIG. 8E illustrates another example of a suitable process variable identification component 320 that is suitable for use when the process variable is the frequency of a channel signal and/or a system output signal. The process variable identification component 320 includes an Analog-to-Digital Converter (ADC) 340 that receives the control signal from the adder 330. The Analog-to-Digital Converter (ADC) 340 converts the first process variable signal from an analog form to a digital form and outputs a digital data signal. The digital data signal is a digital representation of the control signal.

The process variable identification component 320 includes a transform component 342 that receives the digital data signal. The transform component 342 performs a mathematical transform on the digital data signal. The mathematical transform is selected such that the transform component 342 outputs a transformed signal that is related to, includes or indicates the frequency of the LIDAR output signal. A suitable first mathematical transform includes, but is not limited to, a Hilbert transform. A Hilbert transform outputs a transformed signal that indicates the instantaneous phase and, consequently, frequency of the control signal.

The transformed signal is received by a frequency evaluator 344. The frequency evaluator can be configured to output an indicator signal that is related to, includes and/or indicates the frequency of the LIDAR output signal. For instance, the frequency evaluator can convert the instantaneous frequency to the frequency of the channel signal ($f_{CS}$) by $f_{CS}=(finst-f_{LO})*(T/\tau')$, where $f_{LO}$ is the frequency of the local oscillator, finst is the instantaneous frequency extracted from the Hilbert Transform, T is the duration of a data period in a triangular modulation scheme, and $\tau'$ is the delay resulting from the length differential between the delay waveguide 62 and the expedited waveguide 66. Accordingly, the indicator signal can be a digital signal that quantifies the frequency of the frequency of a channel signal ($f_{CS}$). The indicator signal can be received by the light control component 322 for use in controlling the frequency of the laser source.

Although the indicator signal is described in the context of a signal that carries data regarding the frequency of a channel signal, the indicator signal can carry data that is indirectly related to the frequency of the channel signal. For instance, the indicator signal can carry data that can be used to determine the frequency of a channel signal. As an example, the frequency of a channel signal ($f_{TS}$) can be determined from the rate of phase change of the channel signal. Accordingly, the indicator signal can carry data that indicates the rate of phase change of the channel signal.

The process variable identification component 320 reduces the amount of delay that needs to be created by the delay waveguide 62 because it increases the sensitivity of the indicator signal to the frequency of the channel signal by combining the information from in-phase and quadrature components at any given time. Prior systems attempted to increase this sensitivity by increasing the length of the delay pathway. Because the process variable identification component 320 increases the sensitivity of the indicator signal, the length of the delay pathway can exceed the length of the expedited pathway by a lower amount than could be achieved in prior systems. For instance, the time delay in the pathway to a control component 74 can exceed the time delay in the expedited pathway to the control component 74 by an amount that is greater than or equal to 50 ps and less than or equal to 100 ns. In one example, the length of the delay pathway exceeds the length of the expedited pathway by an amount that is less than 1000 cm, less than 500 cm, or less than 100 cm and is greater than 0.0 cm or 0.4 cm. In one example, the delay pathway and the expedited pathway to the same control component 74 guide light through silicon and the length of the delay pathway exceed the length of the expedited pathway by an amount that is less than 1000 cm and greater than 0.0 cm or 0.4 cm.

FIG. 8A through FIG. 8E illustrate an example of a suitable control component for use as all or a fraction of the control component 74 disclosed in the context of FIG. 1A through FIG. 4. As discussed above, each of the control component 74 receives a delay pathway signal and an expedited pathway signal carrying the same channel. In some instances, a laser source 68 is constructed such that different channel signals each carry a different one of the channels and the different channel signals are each output from a different laser source 68. For instance, FIG. 1B illustrates a possible light source 10 construction where different channel signals are each output from a different laser source 68. In these instances, each of the different control components 74 can be used to control the source of the channel signal that carries the channel received by the control component. For instance, each of the different control components 74 can be included in a feedback control loop that operates the laser sources so as to control the frequency of the channel signal that carries the channel received by the control component and accordingly to control the system output signal carrying the same channel. The electronics can independently operate the feedback control loops and can accordingly independently operate the laser sources within those feedback control loops.

The above LIDAR systems illustrate a single system output signal carrying each of the channels. As a result, each control mechanism can control the frequency versus time pattern of a different one of the single system output signals. However, the LIDAR system can be constructed such that multiple different system output signals carry the same channel. For instance, the LIDAR output signal can be divided into multiple different signals that are each used as the source of a system output signal. In this instance, one or more of the control mechanisms can each control the frequency versus time pattern of multiple different system output signals that each carry the same channel.

The control components disclosed in the context of FIG. 8A through FIG. 8E operate on an in-phase component of a process variable signal and the quadrature component of the process variable signal. However, the control components can be configured to operate on the in-phase component of the process variable signal and can exclude the quadrature component of the process variable signal. As a result, the control components can exclude the second light-combining component 286. Accordingly, the control components can include one light-comber and the delay pathway and expedited pathway to a control component can extend to only one light-combiner in the control component.

Although the LIDAR system is disclosed as having multiple control mechanisms that each includes one of the control components 74, the LIDAR system can include as few as one control mechanism. For instance, the laser sources 68 can be configured such that tuning the frequency of one laser source 68 at a rate $\alpha_t$ tunes the other laser source 68 at the same rate. In this instance, controlling one of the laser source 68 as disclosed above provides the desired tuning for each of the laser sources and accordingly provides each of the system output signals with the desired frequency versus time pattern.

Figure 9:
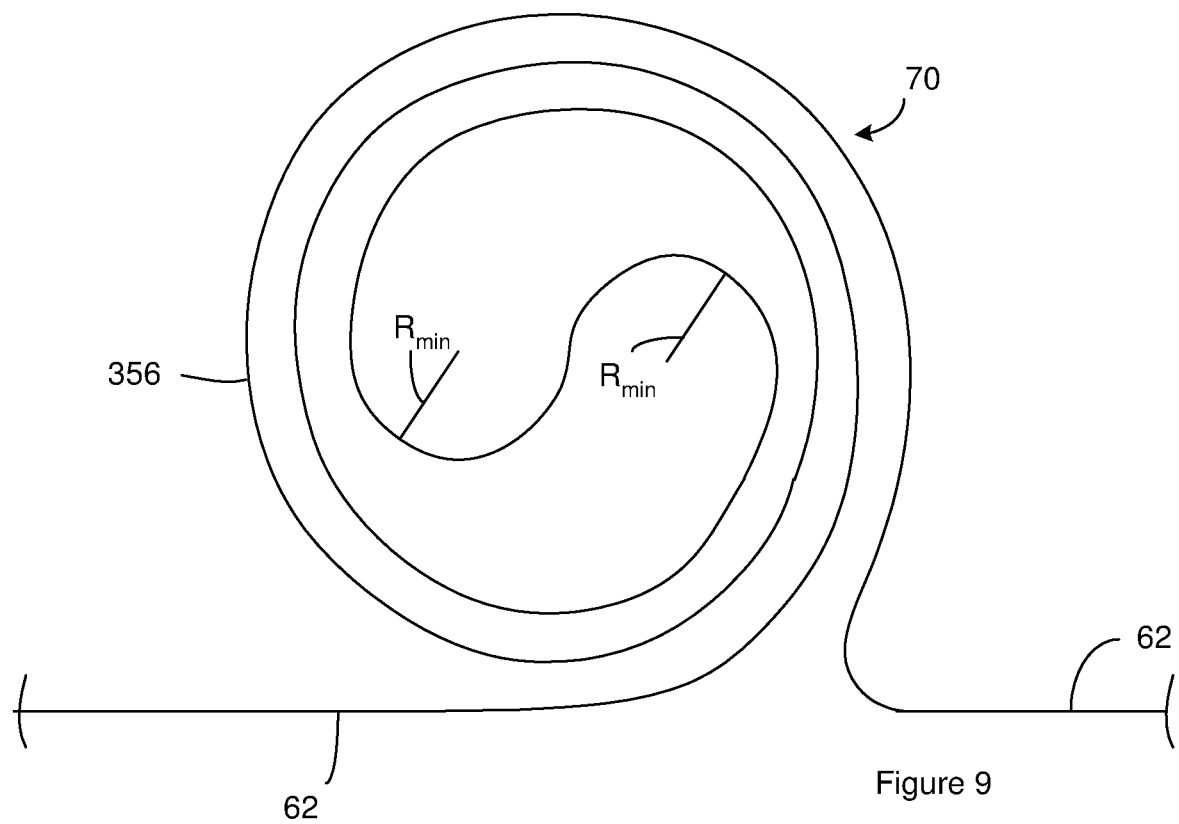
FIG. 9 is a top view of a portion of a waveguide that includes a spiral waveguide.

As noted above, delay waveguides such as a delay waveguide 62 and/or a first delay waveguide 80 can include a delay section 70 that can be used to increase the length of the delay waveguide beyond the length of the expedited waveguide 66. The delay section 70 can represent a spiral arrangement of the delay waveguide 62. The spiral arrangement is selected to reduce the amount of space occupied by a longer waveguide. FIG. 9 illustrates a portion of a delay waveguide 62 or a first delay waveguide 80 having a spiral arrangement. Near the center of the spiral arrangement, the waveguide turns back upon itself. The spiral configuration is selected such that the portion of the waveguide with the smallest radius of curvature (labeled $R_{min}$) has a radius of curvature above a curvature threshold. Suitable curvature thresholds include, but are not limited to, curvature thresholds above or equal to 0.025 mm, 0.1 mm, and 0.3 mm. Although the spiral arrangement is shown in a geometry that approximates a circle, the spiral arrangement can be in other geometries such as shapes that approximate an oval, rectangle or triangle. As a result, the spiral arrangement can include straight waveguide segments and/or substantially straight waveguide segments.

Figure 10A:
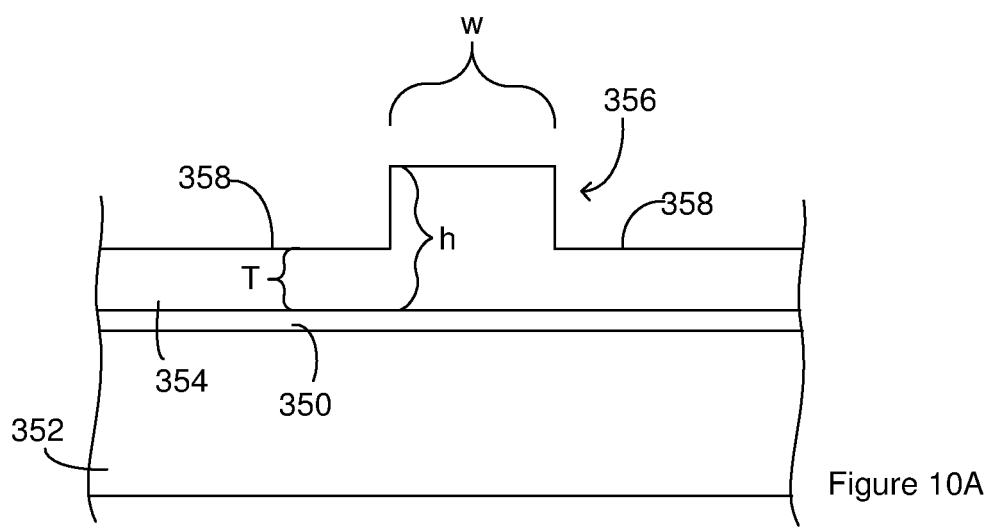
FIG. 10A is a cross-section of portion of a LIDAR chip that includes a waveguide on a silicon-on-insulator platform.

Suitable platforms for the LIDAR chips include, but are not limited to, silica, indium phosphide, and silicon-on-insulator wafers. FIG. 10A is a cross-section of portion of a chip constructed from a silicon-on-insulator wafer. A silicon-on-insulator (SOI) wafer includes a buried layer 350 between a substrate 352 and a light-transmitting medium 354. In a silicon-on-insulator wafer, the buried layer 350 is silica while the substrate 352 and the light-transmitting medium 354 are silicon. The substrate 352 of an optical platform such as an SOI wafer can serve as the base for the entire LIDAR chip. For instance, the optical components shown on the LIDAR chips of FIG. 1A through FIG. 4 can be positioned on or over the top and/or lateral sides of the substrate 352.

FIG. 10A is a cross section of a portion of a LIDAR chip that includes a waveguide construction that is suitable for use in LIDAR chips constructed from silicon-on-insulator wafers. A ridge 356 of the light-transmitting medium extends away from slab regions 358 of the light-transmitting medium. The light signals are constrained between the top of the ridge 356 and the buried oxide layer 350.

The dimensions of the ridge waveguide are labeled in FIG. 10A. For instance, the ridge has a width labeled w and a height labeled h. A thickness of the slab regions is labeled T. For LIDAR applications, these dimensions can be more important than other dimensions because of the need to use higher levels of optical power than are used in other applications. The ridge width (labeled w) is greater than 1 μm and less than 4 μm, the ridge height (labeled h) is greater than 1 μm and less than 4 μm, the slab region thickness is greater than 0.5 μm and less than 3 μm. These dimensions can apply to straight or substantially straight portions of the waveguide, curved portions of the waveguide and tapered portions of the waveguide(s). Accordingly, these portions of the waveguide will be single mode. However, in some instances, these dimensions apply to straight or substantially straight portions of a waveguide. Additionally or alternately, curved portions of a waveguide can have a reduced slab thickness in order to reduce optical loss in the curved portions of the waveguide. For instance, a curved portion of a waveguide can have a ridge that extends away from a slab region with a thickness greater than or equal to 0.0 μm and less than 0.5

µm. While the above dimensions will generally provide the straight or substantially straight portions of a waveguide with a single-mode construction, they can result in the tapered section(s) and/or curved section(s) that are multi-mode. Coupling between the multi-mode geometry to the single mode geometry can be done using tapers that do not substantially excite the higher order modes. Accordingly, the waveguides can be constructed such that the signals carried in the waveguides are carried in a single mode even when carried in waveguide sections having multi-mode dimensions. The waveguide construction disclosed in the context of FIG. 10A is suitable for all or a portion of the waveguides on LIDAR chips constructed according to FIG. 1A through FIG. 4.

Figure 10B:
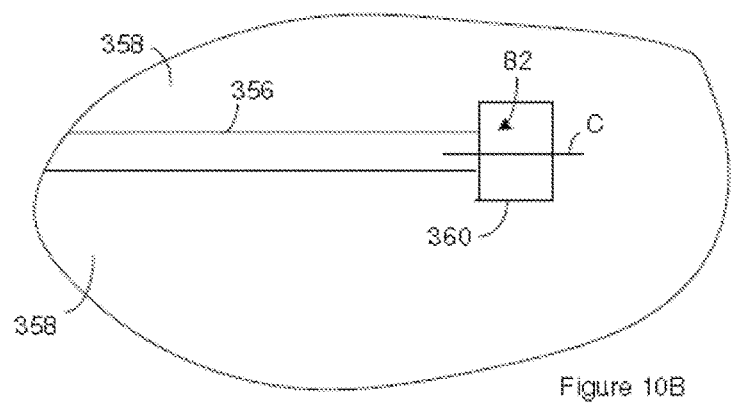
FIG. 10B through FIG. 10D illustrate an example of a return device constructed on a silicon-on-insulator platform and suitable for use on a LIDAR chip constructed according to FIG. 2 and FIG. 4.
Figure 10C:
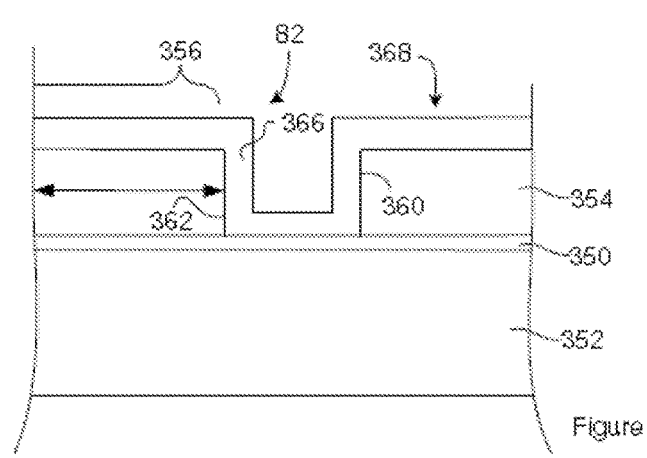
Figure 10D:
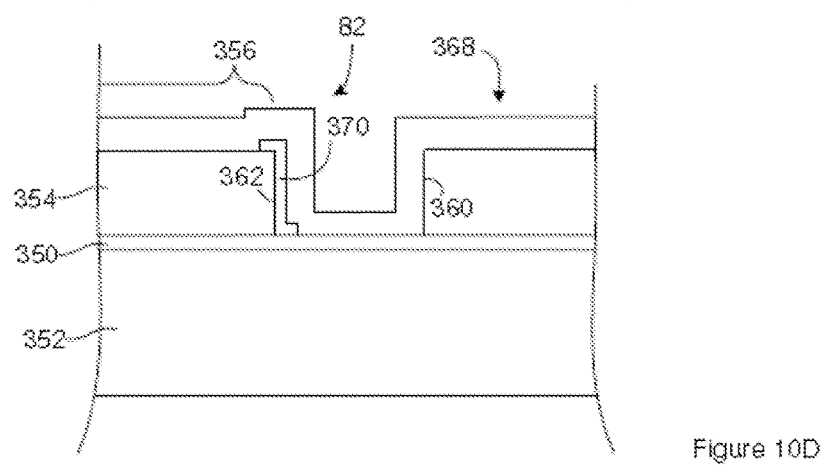

FIG. 10B through FIG. 10D illustrate an example of a return device 82 constructed on a silicon-on-insulator platform and suitable for use on a LIDAR chip constructed according to FIG. 2 and FIG. 4. FIG. 10B is a top view of a portion of a LIDAR chip that has the return device 82. FIG. 10C is a cross section of the return device 82 taken along the line labeled C in FIG. 10B. FIG. 10D is a cross section of the return device 82 taken along the line labeled C in FIG. 10B.

The illustrated return device 82 includes a recess 360 that extends partially or fully through the light-transmitting medium 354. Although the illustrated recess 360 does not extend into the buried layer 350, the illustrated recess 360 can extend into or through buried layer 350. A surface of the recess 360 serves as a return surface 362. The return surface 362 is configured such that at least a portion of the light signal that is incident on the return surface 362 from the light-transmitting medium 354 returns to the light-transmitting medium 354. The mechanism by which the return occurs can be reflection at or by the return surface 362. For instance, a recess medium 366 can be positioned in the recess 360 and in contact with the return surface 362. The recess medium 366 can fill the recess 360 or be a layer of material that contacts the return surface 362. The recess medium 366 can be a fluid or a solid. As shown in FIG. 10C, the recess medium 366 can be a solid that also serves as a cladding 368 for the output component. In some instances, the recess medium 366 has a lower index of refraction than the light-transmitting medium 354 to cause reflection at the return surface 362. Suitable recess media with an index of refraction lower than the light-transmitting medium 354 include, but are not limited to, air, epoxies, silicon dioxide, and silicon nitride. Suitable recess media with an index of refraction lower than the light-transmitting medium 354 that can also serve as cladding include, but are not limited to, silicon dioxide, and silicon nitride.

In some instances, the recess medium 366 is a medium that causes the outgoing LIDAR signal or input signal to be reflected at the return surface 352. For instance, the recess medium 366 can be a reflective material 370 that contacts the return surface 352. FIG. 10D illustrates a layer of reflective material 370 in contact with the return surface 352. Although FIG. 10D illustrates a cladding positioned such that the cladding is located over the recess medium 366 and extends into the recess 360, the cladding is optional. Suitable reflective materials 370 include, but are not limited to, multi-layer dielectric films including silicon dioxide, hafnium oxide and aluminum oxide, and metals such as aluminum, nickel, and gold. Suitable claddings include, but are not limited to, silicon dioxide, silicon nitride, and aluminum oxide.

Light sensors that are interfaced with waveguides on a LIDAR chip can be a component that is separate from the chip and then attached to the chip. For instance, the light sensor can be a photodiode, or an avalanche photodiode. Examples of suitable light sensor components include, but are not limited to, InGaAs PIN photodiodes manufactured by Hamamatsu located in Hamamatsu City, Japan, or an InGaAs APD (Avalanche Photo Diode) manufactured by Hamamatsu located in Hamamatsu City, Japan. These light sensors can be centrally located on the LIDAR chip. Alternately, all or a portion the waveguides that terminate at a light sensor can terminate at a facet located at an edge of the chip and the light sensor can be attached to the edge of the chip over the facet such that the light sensor receives light that passes through the facet. The use of light sensors that are a separate component from the chip is suitable for all or a portion of the light sensors selected from the group consisting of the first auxiliary light sensor 218, the second auxiliary light sensor 220, the first light sensor 223, and the second light sensor 224.

As an alternative to a light sensor that is a separate component, all or a portion of the light sensors can be integrated with the chip. For instance, examples of light sensors that are interfaced with ridge waveguides on a chip constructed from a silicon-on-insulator wafer can be found in Optics Express Vol. 15, No. 21, 13965-13971 (2007); U.S. Pat. No. 8,093,080, issued on Jan. 10 2012; U.S. Pat. No. 8,242,432, issued Aug. 14 2012; and U.S. Pat. No. 6,108,8472, issued on Aug. 22, 2000 each of which is incorporated herein in its entirety. The use of light sensors that are integrated with the chip are suitable for all or a portion of the light sensors selected from the group consisting of the auxiliary light sensor 218, the second auxiliary light sensor 220, the first light sensor 223, and the second light sensor 224.

A suitable laser source 68 can be a laser chip that is separate from the LIDAR chip and then attached to the LIDAR chip. For instance, a laser source 68 can be a laser chip that is attached to the chip using a flip-chip arrangement. Use of flip-chip arrangements is suitable when a laser source 68 is to be interfaced with a ridge waveguide on a chip constructed from silicon-on-insulator wafer. Alternately, the utility waveguide 12 can include an optical grating (not shown) such as Bragg grating that acts as a reflector for an external cavity laser. In these instances, the laser source 68 can include a gain element that is separate from the LIDAR chip and then attached to the LIDAR chip in a flip-chip arrangement. Examples of suitable interfaces between flip-chip gain elements and ridge waveguides on chips constructed from silicon-on-insulator wafer can be found in U.S. Pat. No. 9,705,278, issued on Jul. 11, 2017 and in U.S. Pat. No. 5,991,484 issued on Nov. 23 1999; each of which is incorporated herein in its entirety. When the laser source 68 is a gain element or laser chip, the electronics 62 can change the frequency of the channel signal by changing the level of electrical current applied to through the gain element or laser cavity.

Suitable electronics 62 can include, but are not limited to, an electronic controller that includes or consists of analog electrical circuits, digital electrical circuits, processors, microprocessors, digital signal processors (DSPs), Field Programmable Gate Arrays (FPGAs), computers, microcomputers, or combinations suitable for performing the operation, monitoring and control functions described above. In some instances, the electronic controller has access to a memory that includes instructions to be executed by the electronic controller during performance of the operation, control and monitoring functions. Although the electronics are illustrated as a single component in a single location, the electronics can include multiple different components that are independent of one another and/or placed in different locations. Additionally, as noted above, all or a portion of the disclosed electronics can be included on the chip including electronics that are integrated with the chip.

The above LIDAR systems include multiple optical components such as a LIDAR chip, LIDAR adapters, light source, light sensors, waveguides, and amplifiers. In some instances, the LIDAR systems include one or more passive optical components in addition to the illustrated optical components or as an alternative to the illustrated optical components. The passive optical components can be solid-state components that exclude moving parts. Suitable passive optical components include, but are not limited to, lenses, mirrors, optical gratings, reflecting surfaces, splitters, demultiplexers, multiplexers, polarizers, polarization splitters, and polarization rotators. In some instances, the LIDAR systems include one or more active optical components in addition to the illustrated optical components or as an alternative to the illustrated optical components. Suitable active optical components include, but are not limited to, optical switches, phase tuners, attenuators, steerable mirrors, steerable lenses, tunable demultiplexers, tunable multiplexers.

Other embodiments, combinations and modifications of this invention will occur readily to those of ordinary skill in the art in view of these teachings. Therefore, this invention is to be limited only by the following claims, which include all such embodiments and modifications when viewed in conjunction with the above specification and accompanying drawings.

The invention claimed is:

1. A LIDAR (Light Detection and Ranging) system, comprising:
   one or more light splitters and multiple light combiners; and
   the LIDAR system having multiple optical pathways through which light signals can travel, the optical pathways including multiple delay pathways that each extends from a first one of the one or more splitters to a different one of the light combiners; and
   the optical pathways including expedited pathways that each extends from the first one of the one or more splitters to a different one of the light combiners,
   the expedited pathways separating from the delay pathways at the first one of the one or more splitters,
   the expedited pathways and the delay pathways do not extend outside of the LIDAR system,
   each of the light combiners having one of the delay pathways and one of the expedited pathways extending to the light combiner,
   the delay pathways and the expedited pathways being configured such that the delay pathway to each one of the light combiners is longer than the expedited pathway to the same light combiner, and
   each of the delay pathways having a common portion and a separated portion, the common portion of the delay pathways being shared by each of the delay pathways and the separated portions of each delay pathway being separate from the other delay pathways.

2. The system of claim 1, wherein the common portion includes a spiral waveguide.

3. The system of claim 1, wherein each of the delay waveguides includes multiple separated portions.

4. The system of claim 1, wherein light signals that travel the common portion carry multiple channels and the light signals that travel the separated portions carry a single channel.

5. The system of claim 1, wherein each of the delay pathways extends from the same one of the one or more splitters.

6. The system of claim 1, wherein each of the expedited pathways extends from a different splitter.

7. The system of claim 1, wherein each of the expedited pathways extends from the same splitter.

8. The system of claim 1, wherein each of the delay pathways and each of the expedited pathways extends from the same one of the one or more splitters.

9. The system of claim 1, wherein each of the one or more splitters is a wavelength dependent splitter.

10. The system of claim 1, wherein the delay pathways and the expedited pathways are configured such that the delay pathway that and the expedited pathway that extend to the same light combiner extend from the same one of the one or more splitters.

11. The system of claim 1, wherein the LIDAR system is configured to output system output signals that travels away from the LIDAR system and can be reflected by an object located outside of the LIDAR system; and
   electronics configured to control a frequency of each of the system output signals, the electronics using an electrical process variable signal to control the frequency, the process variable signal including an in-phase component and a quadrature component, the process variable being generated from light signals received from one of the delay pathways and one of the expedited pathways.

12. The system of claim 1, wherein the delay pathways and the expedited pathways are included in a photonic integrated circuit on a LIDAR chip.

13. The system of claim 1, wherein the LIDAR chip has a silicon- on-insulator platform.

14. The system of claim 1, wherein the optical pathways are configured such that the light signals on the delayed pathway and the expedited pathway to each of the combiners carries the same channel but the light signals on the delayed pathway and the expedited pathway to different combiners carry different channels.

15. A LIDAR (Light Detection and Ranging) system, comprising:
   a light splitter and a light combiner;
   the LIDAR system configured to output a system output signal, the LIDAR system having multiple optical pathways through which light signals can travel without being transmitted from the LIDAR system, the optical pathways including a delay pathway that each extends from the splitter to the light combiner; and
   the optical pathways including an expedited pathway that each extends from the splitter to the light combiner,
   the delay pathway and the expedited pathway being configured such that the delay pathway is longer than the expedited pathway, and
   the delay pathway having a return component configured to receive a delay pathway light signal traveling a first direction along the delay pathway and to return the delay pathway light signal to the delay pathway traveling such that the return the delay pathway light signal travels along the delay pathway in a second direction that is the reverse of the first direction.

16. The system of claim 15, wherein the return component is a mirror.

17. The system of claim 15, wherein the delay pathway includes a spiral waveguide.

18. The system of claim 15, wherein the LIDAR system is configured to output a system output signal that travels away from the LIDAR system and can be reflected by an object located outside of the LIDAR system; and electronics configured to control a frequency of the system output signal, the electronics using an electrical process variable signal to control the frequency, the process variable signal including an in-phase component and a quadrature component, the process variable being generated from light signals received from the delay pathway and the expedited pathway.

19. The system of claim 15, wherein the delay pathway and the expedited pathway are included in a photonic integrated circuit on a LIDAR chip.

20. The system of claim 17, wherein the splitter is a wavelength dependent splitter.

* * * * *